United States Patent [19]

Yamazaki et al.

[11] Patent Number: 4,730,903

[45] Date of Patent: Mar. 15, 1988

[54] FERROELECTRIC CRYSTAL DISPLAY PANEL AND MANUFACTURING METHOD THEREOF

[75] Inventors: Shunpei Yamazaki; Takashi Inushima; Akira Mase; Toshimitsu Konuma; Mitsunori Sakama, all of Tokyo, Japan

[73] Assignee: Semiconductor Energy Laboratory Co., Ltd., Kanagawa, Japan

[21] Appl. No.: 821,840

[22] Filed: Jan. 23, 1986

[30] Foreign Application Priority Data

Jan. 23, 1985 [JP] Japan .................. 60-010299
Jan. 23, 1985 [JP] Japan .................. 60-010300

[51] Int. Cl.$^4$ .................................................. G02F 1/13
[52] U.S. Cl. .................. 350/334; 350/339 R; 350/350 S; 430/321
[58] Field of Search ............. 350/339 R, 350 S, 334, 350/336, 320; 430/319, 321, 324

[56] References Cited

U.S. PATENT DOCUMENTS

| 4,289,845 | 9/1981 | Bowden et al. | 430/321 X |
| 4,307,181 | 12/1981 | Ganguille et al. | 430/324 X |
| 4,396,458 | 8/1983 | Platter et al. | 430/324 X |
| 4,431,271 | 2/1984 | Okubo | 350/339 R X |
| 4,490,014 | 12/1984 | Levinson | 350/339 R X |
| 4,666,252 | 5/1987 | Yaniv et al. | 350/339 R X |

FOREIGN PATENT DOCUMENTS

| 0073705 | 3/1983 | European Pat. Off. | 350/339 R |
| 60-164725 | 8/1985 | Japan | 350/339 R |

Primary Examiner—Stanley D. Miller
Assistant Examiner—Richard Gallivan
Attorney, Agent, or Firm—Gerald J. Ferguson, Jr.; Michael P. Hoffman; Michael J. Foycik, Jr.

[57] ABSTRACT

A ferroelectric liquid crystal display having a matrix of ferroelectric liquid crystal elements and nonlinear elements having a diode characteristic in which the liquid crystal elements are connected in series with the nonlinear elements. The first substrate member comprises (a) a transparent first substrate having an insulating surface, (b) a plurality of $m \times n$ ($m>1$, $n>1$) of rectangular transparent conductive layers $C_{11}$ to $C_{1n}$, $C_{21}$ to $C_{2n}$, ... $C_{m1}$ to $C_{mn}$ arranged on the substrate in a matrix form on the first substrate, (c) a layer member $A_{ij}$ formed on the conductive layer $C_{ij}$ (where $i=1, 2 ... m$ and $j=1, 2 ... n$) and (d) a stripe-like conductive layer $F_i$ extending in the row direction and making contact with layer member $A_{i1}$ to $A_{in}$ on the side opposite from the conductive layer $C_{i1}$ to $C_{in}$, wherein the opposing side surfaces a and a' of the layer member $A_{ij}$ defining is length are substantially aligned with the opposing side surfaces b and b' of the conductive layer $C_{ij}$ defining its width, respectively, and wherein the opposing side surface b and b' of the layer member $A_{ij}$ defining its width are substantially aligned with the opposing side surfaces b and b' of the conductive layer $F_i$ defining its width, respectively. The layer member $A_{ij}$ may be a laminate layer of a first nontransparent conductive layer, non-single-crystal semiconductor layer member or thin insulating layer which permits passage therethrough of tunnel current and a second nontransparent conductive layer.

27 Claims, 113 Drawing Figures

FERROELECTRIC CRYSTAL DISPLAY PANEL AND MANUFACTURING METHOD THEREOF

BACKGROUND OF THE INVENTION

1. Field of the Invention

The present invention relates to a liquid crystal display panel which employs liquid crystal display devices each of which has a nonlinear element having a diode characteristic and a liquid crystal element. The invention also pertains to methods for the manufacture of the liquid crystal display panel.

2. Description of the Prior Art

Heretofore there has been proposed a display panel which employs a plurality $m \times n$ (where $n > 1$ and $m > 1$) of liquid crystal display devices $M_{11}$ to $M_{1n}$, $M_{21}$ to $M_{2n}$, ... and $M_{m1}$ to $M_{mn}$. The liquid crystal display device $M_{ij}$ (where $i = 1, 2 \ldots n$, $j = 1, 2 \ldots n$) has a nonlinear element $U_{ij}$ having a diode characteristic and a liquid crystal element $L_{ij}$. In this display panel, the liquid crystal display device $M_{ij}$ is connected to a row conductive layer $F_i$ and a column conductive layer $H_j$ at their intersection.

With such a display panel, an image display can be provided by driving the liquid crystal devices $M_{11}$ to $M_{mn}$ using the row conductive layers $F_i$ to $F_m$ and the column conductive layers $H_1$ to $H_n$.

However, the conventional display panel is very complex in the structure of the nonlinear element $U_{ij}$, in the structure of the liquid crystal element $L_{ij}$ and in the structure for conencting the liquid crystal display device $M_{ij}$ to the row conductive layer $F_i$ and the column conductive layer $H_j$. On this account, the prior art liquid crystal display panel is difficult to manufacture and expensive.

Furthermore, it is difficult to arrange $m \times n$ liquid crystal display devices $M_{11}$ to $M_{mn}$ in an $(m \times n)$ matrix form with a high density, so that resolution of the image display is relatively low. Moreover, the conventional liquid crystal display panel is large in thickness. Besides, it is necessary to apply high voltage, as drive signals across the row conductive layers $F_1$ to $F_m$ and the column conductive layers $H_1$ to $H_n$ for producing an image display. In addition, the angle of field over which the image display can be clearly observed is narrow.

SUMMARY OF THE INVENTION

It is therefore an object of the present invention to provide a novel liquid crystal display panel which employs liquid crystal display devices each of which has a ferroelectric liquid crystal element and a nonlinear element having a diode characteristic and connected in series with the liquid crystal element, and which is free from the abovesaid defects of the prior art.

Another object of the present invention is to provide novel methods for the manufacture of such a liquid crystal display panel.

In accordance with an aspect of the present invention, the liquid crystal display panel comprises (a) first and second substrate members disposed opposite at a predetermined distance in substantially parallel relation to each other and (b) ferroelectric liquid crystal filled between the first and second substrate members.

The first substrate member comprises (a) a transparent first substrate having an insulating surface, (b) a plurality of $m \times n$ ($m > 1$, $n > 1$) of rectangular transparent conductive layers $C_{11}$ to $C_{1n}$, $C_{21}$ to $C_{2n}$, ... $C_{m1}$ to $C_{mn}$ arranged on the substrate in a matrix form on the first substrate, (c) a layer member $A_{ij}$ formed on the conductive layer $C_{ij}$ (where $i = 1, 2 \ldots m$ and $j = 1, 2 \ldots n$) and (d) a stripe-like conductive layer $F_i$ extending in the row direction and making contact with layer member $A_{i1}$ to $A_{in}$ on the side opposite from the conductive layer $C_{i1}$ to $C_{in}$, wherein the opposing side surfaces a and a' of the layer member $A_{ij}$ defining its length are substantially aligned with the opposing side surfaces b and b' of the conductive layer $c_{ij}$ defining its width, respectively, and wherein the opposing side surface b and b' of the layer member $A_{ij}$ defining its width are substantially aligned with the opposing side surfaces b and b' of the conductive layer $F_i$ defining its width, respectively. The layer member $A_{ij}$ may a laminate layer of a first nontransparent conductive layer, non-single-crystal semiconductor layer member or thin insulating layer which permits passage therethrough of tunnel current and a second nontransparent conductive layer. The layer member $A_{ij}$ may have an insulating layer on the second nontransparent conductive layer thereof. The first substrate may have an insulating layer $K_{ij}$ (where j does not take n) formed thereon at a portion between the layer members $A_{ij}$ and $A_{i(j+1)}$. In this instance, the conductive layer $F_i$ may extend on the insulating layer $K_{i1}$ to $K_{i(n-1)}$.

The second substrate member comprises (a) a transparent second substrate having an insulating surface and (b) a plurality of n of stripe-like transparent conductive layers $H_1$, $H_2$ ... $H_n$ sequentially arranged on the second substrate in the row direction and extending in the column direction, the conductive layers $H_j$ being opposite the conductive layers $C_{1j}$ to $C_{mj}$.

The laminate member $A_{ij}$ constitutes a nonlinear element $U_{ij}$. A first part of the conductive layer $C_{ij}$ not forming the layer member $A_{ij}$, a second part of the conductive layer $H_j$ confronting the first part of the conductive layer $C_{ij}$, and a third part of the ferroelectric liquid cyrstal between the first part of the conductive layer $C_{ij}$ and the second part of the conductive layer $H_j$ constitute a ferroelectric liquid crystal element $L_{ijr}$. The first substrate member and the second substrate member may define a space 3 $\mu$m or less in height between the that part of the surface of the first substrate member under which the first part of the conductive layer $C_{ij}$ lies and that part of the surface of the second substrate member udner which the second part of the conductive layer $H_j$ lies.

According to such a liquid crystal display panel of the present invention, the liquid crystal element $L_{ij}$ can be driven through the nonlinear element $U_{ij}$ by applying a driving signal across the row conductive layer $F_i$ and the column conductive layer $H_j$. Accordingly, the liquid crystal display panel provides an image display.

In accordance with another aspect of the present invention, the liquid crystal display panel comprises (a) first and second substrate members and ferroelectric liquid crystal, as of the liquid crystal display panel previously mentioned.

The first substrate member comprises (a) a first substrate having an insulating surface, (b) a plurality m of stripe-like row conductive layer $F_1$ to $F_m$ formed on the first substrate, (c) a plurality in of layer member $A_{i1}$ to $A_{in}$ formed on the row conductive layer $F_i$ and (d) transparent conductive layer $C_{ij}$ making contact with the layer member $A_{ij}$ on the side opposite from the conductive layer $F_i$. The opposing side surfaces b and b' of the conductive layer $C_{ij}$ defining its width are substantially aligned with the opposing side surfaces a and a' of the layer member $A_{ij}$ defining its length, respectively. The layer member $A_{ij}$ may be a laminate member of a non-single-crystal semiconductor layer member or a thin insulating layer which permits passage therethrough tunnel current and a nontransparent conductive layer. The layer member $A_{ij}$ may also be a laminate member of a first nontransparent conductive layer, a non-single-crystal semiconductor layer member or a thin insulating layer which permits passage therethrough tunnel current and a second nontransparent conductive layer. The first substrate member may has an insulating layers $K_{ij}'$ and $K_{ij}''$ formed thereon at a portion under the conductive layer $C_{ij}$. In this instance, the insulating layers $K_{ij}'$ and $K_{ij}''$ are in contact with the opposing side surfaces b and b' of the layer member $A_{ij}$ defining its width.

The second substrate member has the same construction as of the previously mentioned liquid crystal display panel. The first and second substrate members may define a space 3 $\mu$m or less in height between that part of the surface of the first substrate member under which the conductive layer $C_{ij}$ lies and that part of the surface of the second substrate member under which the part of the conductive layer $H_j$ confronting the conductive layer $C_{ij}$ lies.

The layer member $A_{ij}$ constitutes a nonlinear element $U_{ij}$, as of the previous mentioned display panel. The conductive layer $C_{ij}$, a part of the conductive layer $H_j$ confronting the conductive layer $C_{ij}$ and a part of the ferroelectric liquid crystal between the layer member $C_{ij}$ and the part of the conductive layer $H_j$ confronting the conductive layer $C_{ij}$ constitutes a ferroelectric liquid crystal element $L_{ij}$.

According to such a liquid crystal display panel of the present invention, the liquid crystal display panel also provides an image display as of the previously mentioned display panel.

Accordingly, the liquid crystal display panel of the present invention is far simpler in structure than is conventional, in consequence of which m×n display crystal elements $M_{11}$ to $M_{mn}$ can be arranged in an m×n matrix form with a high density, ensuring to provide an image display with high resolution.

According to the present invention, the liquid crystal display panel can also be produced by a manufacturing method of the present invention which includes a step (A) preparing a first substrate member, (B) preparing a second substrate member, (C) turning the second substrate member upside down and disposing the first and second substrate members in opposing and substantially parallel relation to each other and (D) filling ferroelectric liquid crystal in the gap defined by the first and second substrate members, as of previously mentioned method.

The step of preparing the first substrate member which includes the steps of (a) forming, on a transparent firs substrate, a first layer member which has a first conductive layer formed on the first substrate and a second layer member formed on the first conductive layer, the second layer member having a second conductive layer formed on the first conductive layer, a third layer member formed on the second conductive layer and a third conductive layer formed on the third layer, the third layer member having a non-single-crystal layer member or a first insulating layer which permits the passage therethrough of tunnel current, (b) patterning the first layer member into a plurality m×n (m>1, n>1) of fourth layer members $B_{11}$ to $B_{1n}$, $B_{21}$ to $B_{2n}$, $B_{31}$ to $B_{3n}$ ... $B_{m1}$ to $B_{mn}$ sequentially arranged in a matrix form, the fourth layer member $B_{ij}$ (where i=1, 2 ... m and j=1, 2, 3, ... n) having a fourth conductive layer $C_{ij}$ formed by the first conductive layer on the first substrate and a fifth layer member $D_{ij}$ formed by the second layer member on the fourth conductive layer $C_{ij}$, (c) depositing, on the first substrate, a photosensitive organic resin layer to cover the fourth laminate members $B_{11}$ to $B_{mn}$, (d) forming, by the photosensitive resin layer, a second insulating layer surrounding each of the fourth layer members $B_{11}$ to $B_{mn}$ on the first substrate, the second insulating layer forming step including exposure of the photosensitive organic resin layer to light applied from the side of the first substrate and development of the exposed photosensitive organic resin layer, (e) depositing, over the first substrate, a fifth conductive layer extending on the fourth layer members $B_{11}$ to $B_{mn}$ and the first insulating layer and (f) patterning the fifth condcutive layer, the fourth layer members $B_{11}$ to $B_{1n}$, $B_{21}$ to $B_{2n}$, ... $B_{m1}$ to $B_{mn}$ and the second insulating layer into sixth layer members $A_{11}$ to $A_{1n}$, $A_{21}$ to $A_{2n}$, ... $A_{m1}$ to $A_{mn}$ formed by the fourth layer member $B_{11}$ to $B_{1n}$, $B_{21}$ to $B_{2n}$, $B_{31}$ to $B_{3nl}$, ... $B_{m1}$ to $B_{mn}$ on the fourth conductive layers $C_{11}$ to $C_{1n}$, $C_{21}$ to $C_{2n}$, ... $C_{m1}$ to $C_{mn}$, respectively, third insulating layers $K_{11}$ to $K_{1(n-1)}$, $K_{21}$ to $K_{2(n-1)}$, ... $K_{m1}$ to $K_{m(n-1)}$ formed by the first insulating layer on the first substrate between the sixth layer members $A_{11}$ and $A_{12}$ to $A_{1(n-1)}$ and $A_{1n}$, $A_{21}$ and $A_{22}$ to $A_{2(n-1)}$ and $A_{2n}$, ... $A_{m1}$ and $A_{m2}$ to $A_{m(n-1)}$ and $A_{mn}$ and sixth conductive layers $F_1, F_2, ... F_m$ formed by the fifth conductive layer and extending on the sixth layer members $A_{11}$ to $A_{1n}$ and the insulating layers $K_{11}$ to $K_{1(n-1)}$, the sixth layer members $A_{21}$ to $A_{2n}$ and the third insulating layers $K_{21}$ to $K_{2(n-1)}$, ... the sixth layer members $A_{m1}$ to $A_{m2}$ and the third insulating layers $K_{m1}$ to $K_{m(n-1)}$, respectively.

The step of preparing the second substrate member includes the steps of forming, on or over a second substrate having an insulating surface, a plurality n of seventh conductive layers $H_1, H_2, ... H_n$ sequentially arranged in the row direction and extending in the column direction.

According to the present invention, the liquid crystal display panel can also be produced by a manufacturing method of the present invention which includes a step of (A) preparing a first substrate member, (B) preparing a second substrate member, (C) turning the second substrate member upside down and disposing the first and second substrate members in opposing and substantially parallel relation to each other and (D) filling ferroelectric liquid crystal in the gap defined by the first and second substrate members, as of previously mentioned method.

The step of preparing a first substrate member by the steps of (a) forming, on a first substrate, a first layer member which has a first conductive layer formed on the first substrate and a second layer member formed on the first conductive layer, the second layer member having a third layer member formed on or over the second conductive layer and a second conductive layer formed on the third layer member, the third layer member having a non-single-crystal layer member or a first insulating layer which permits the passage therethrough of tunnel current, (b) patterning the first layer member into a plurality m of fourth laminate members $B_1, B_2, ... B_m$ sequentially arranged in the column direction and extending in the row direction, the fourth layer member $B_i$ (where i=1, 2 ... m) having a third conductive layer $F_i$ formed by the first conductive layer on the first substrate and a fifth layer member $D_i$ formed by the second layer member on the third conductive layer $F_i$, (c) depositing, on the first substrate, a photosensitive organic resin layer to cover the fourth laminate members $B_1$ to $B_m$, (d) forming, by the photosensitive resin layer, a second insulating layer surrounding each of the layer members $B_1$ to $B_m$ on the first substrate, the second insulating layer forming step including exposure of the photosensitive organic resin layer to light applied from the side of the first substrate and development of the exposed photosensitive organic resin layer, (e) depositing, over the first substrate, a fourth conductive layer extending on the fourth layer members $B_1$ to $B_m$ and the second insulating layer, (f) patterning the fourth conductive layer, the fifth layer members $D_1$ to $D_m$ and the second insulating layer into fifth conductive layer $C_{11}$ to $C_{1n}$, $C_{21}$ to $C_{2n}$, ... $C_{m1}$ to $C_{mn}$ formed by the fourth conductive layer, sixth layer members $A_{11}$ to $A_{1n}$, $A_{21}$ to $A_{2n}$, ... $A_{m1}$ to $A_{mn}$ formed by the fifth layer member $D_1$ to $D_2$... $D_m$ on the third conductive layers $F_1$, $F_2$, ... $F_m$, respectively, third insulating layers $K_{11}'$ to $K_{1n}'$, $K_{21}'$ to $K_{2n}'$ ... $K_{m1}'$ to $K_{mn}'$ and fourth insulating layer $K_{11}''$ to $K_{1n}''$, $K_{21}''$ to $K_{2n}''$, ... $K_{m1}''$ to $K_{mn}''$ formed by the second insulating layer on the first substrate the third insulating layer $K_{ij}'$ being formed under the fifth conductive layer $C_{ij}$ and making contact with the first surface of the third conductive layer $F_i$ and the first surface of the sixth layer member $A_{ij}$, the fourth insulating layer $K_{ij}''$ being formed under the fifth conductive layer $C_{ij}$ and making contact with the second surface of the third conductive layer $F_i$ and the second surface of the sixth layer member $A_{ij}$, the first and second surface of the third conductive layer $F_i$ defining its width, and the first and second surface of the sixth layer member $A_{ij}$ defining its width.

The step of preparing a second substrate member by the steps of forming, on or over a second substrate having an insulating surface, a plurality n of sixth conductive layers $H_1$, $H_2$, ... $H_n$ sequentially arranged in the row direction and extending in the column direction.

The manufacturing method of the present invention requires only three masks for the fabrication of the liquid crystal display.

Accordingly, the liquid crystal display panel having the abovesaid advantages can easily be manufactured at low cost.

Other objects, features and advantages of the present invention will become more fully apparent from the following detailed description taken in conjunction with the accompanying drawings.

BRIEF DESCRIPTION OF THE DRAWINGS

FIGS. 16A~16E to 25A~26E are a diagrams for explaining the manufacture of the liquid crystal display panel shown in FIGS. 15A to 15E by the method of the invention.

DESCRIPTION OF THE PREFERRED EMBODIMENTS

Figure 1A:
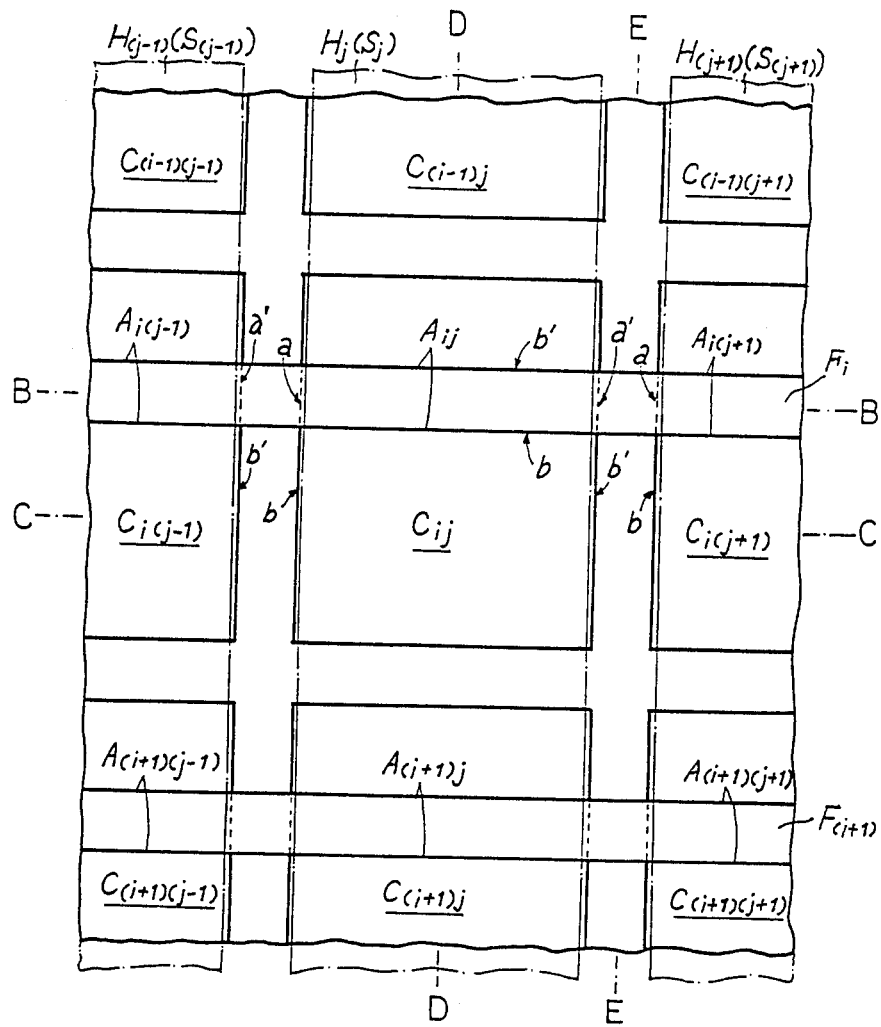
FIG. 1A is a plan view schematically illustrating an embodiment of the liquid crystal display panel of the present invention.
Figure 1B:
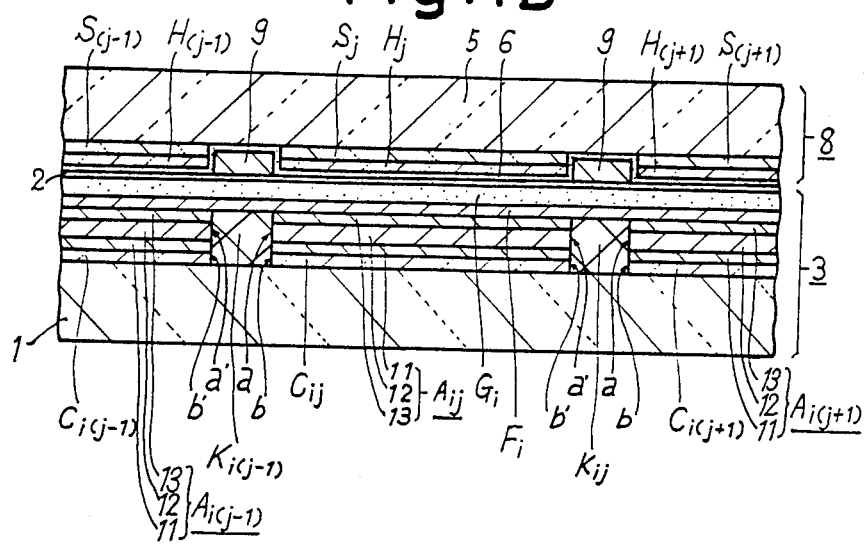
FIGS. 1B, 1C, 1D and 1E are sectional views respectively taken on the lines B—B, C—C, D—D and E—E in FIG. 1E.
Figure 1C:
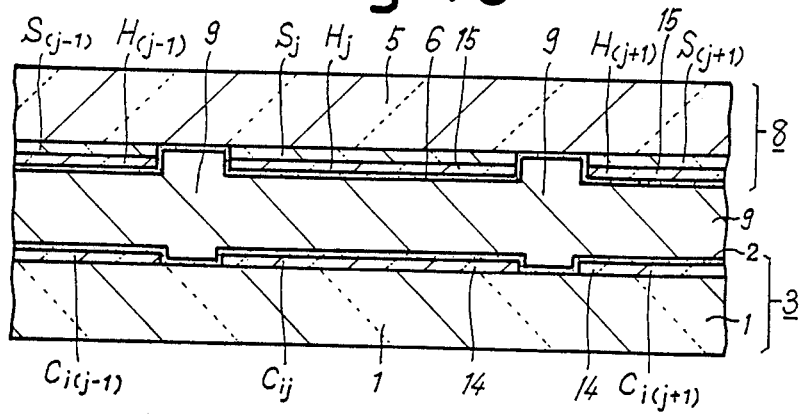
Figure 1D:
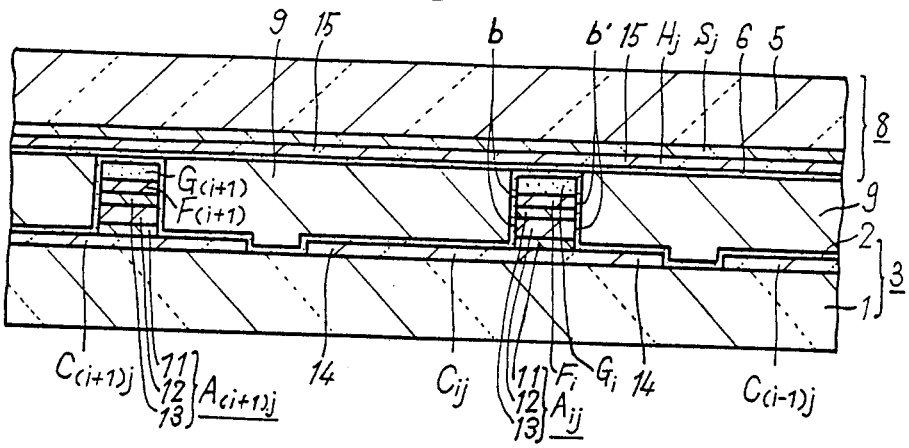
Figure 1E:
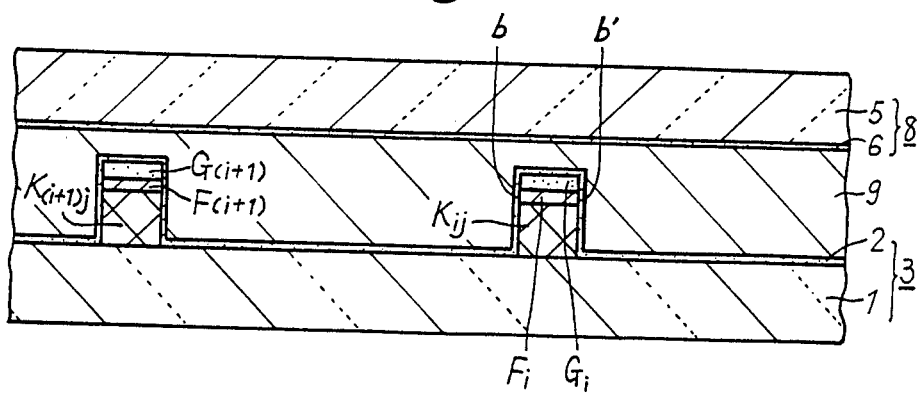

FIGS. 1A to 1E illustrate an embodiment of the liquid crystal display panel of the present invention, in which a substrate 1 has an insulating surface. The substrate 1 is transparent and is formed of, for instance, alkaline free glass.

The substrate 1 has arranged thereon in a matrix form a plurality of m×n (where m>1, n>1) of conductive layers $C_{11}$ to $C_{1n}$, $C_{21}$ to $C_{2n}$ ... $C_{m1}$ to $C_{mn}$. The conductive layer $C_{ij}$ (where i=1, 2 ... m and j=1, 2 ... n) is rectangular in shape and has a relatively large area, for example, 100 μm wide and 150 μm length. The conductive layer $C_{ij}$ is transparent and is formed of, for instance, indium tin oxide or tin oxide.

The conductive layer $C_{ij}$ has formed thereon a stripe-like layer member $A_{ij}$. The layer member $A_{ij}$ extends in the row direction and has the same length as the width of the conductive layer $C_{ij}$. The opposing side surfaces a and a' of the layer member $A_{ij}$, which, in turn, determines the length of the layer member $A_{ij}$ are substantially aligned with the opposing side surfaces b and b' of the conductive layer $C_{ij}$, which, in turn, determines the width of the conductive layer $C_{ij}$, respectively. The width of the layer member $A_{ij}$ is far smaller than the length of the conductive layer $C_{ij}$.

The layer member $A_{ij}$ is a laminate member comprised of a nontransparent conductive layer 11 formed of, for example, chromium, a layer member 12 and a nontransparent conductive layer 13 formed of, for instance, chromium.

The layer member 12 may be a non-single-crystal semiconductor layer member which has, for example, an n-i-n type structure composed of an n-type layer, an i-type layer and an n-type layer, and n-i-p (or p⁻)-i-n type structure composed of an n-type layer, an i-type layer, a p(or p⁻)-type layer, and i-type layer and an n-type layer, a p-i-p type structure composed of a p-type layer, an i-type layer and a p-type layer, or a p-i-n(or n⁻)-i-p type structure composed of a p-type layer, and i-type layer, an n(or n⁻)-type layer, an i-type layer and a p-type layer. The layer member 12 also may be only a very thin insulating layer which permits the passage therethrough of tunnel current. In the case where the layer member 12 is the thin insulating layer, the insulating layer may be formed of tantalum or silicon nitride. In the case where the insulating layer is formed of tantalum nitride the conductive layers may be preferably formed of titanium, and where the insulating layer is formed of silicon nitride, the conductive layer may be preferably formed of chromium.

For the sake of brevity, the following description will be made in connection with the case where the layer member 12 is the non-single-crystal semiconductor layer member which has the n-i-n type structure.

The layer member 12 has an n-type non-single-crystal semiconductor layer of, for example, silicon formed on the conductive layer 11, an i-type non-single-crystal semiconductor layer of, for example, $Si_xC_{1-x}$ ($0.5 < x \leq 1$) formed on the n-type layer and an n-type non-single-crystal layer of, for example, silicon formed on the i-type layer.

The substrate 1 has formed thereover a stripelike conductive layer $F_i$ extending in the row direction and making contact with the nontransparent conductive layers 13 of the layer members $A_{i1}, A_{i2}, A_{i3} \ldots A_{in}$ on the side opposite from the conductive layers $C_{i1}, C_{i2} \ldots C_{in}$. The conductive layer $F_i$ has substantially the same width as those of the layer members $A_{i1}$ to $A_{in}$ and is formed of, for instance, aluminum. The opposing side surfaces b and b' of the conductive layer $F_i$, which define the width of the conductive layer $F_i$, are substantially aligned with the opposing side surfaces b and b' of the layer member $A_{ij}$, which, in turn, define the width of the layer member $A_{ij}$.

The substrate 1 has formed thereon insulating layers $K_{i1}, K_{i2}, \ldots K_{i(n-1)}$ extending between the layer member $A_{i1}$ and $A_{i2}, A_{i2}$ and $A_{i3}, \ldots A_{i(n-1)}$ and $A_{in}$ under the conductive layer $F_i$, respectively. The insulating layer $K_{ij}$ (where j does not take n with respect to the insulating layer) has the same width as that of the conductive layer $F_i$ and is formed of, for instance, an organic resin such as a chemically stable heat-proof polymide resin. The insulating layer $K_{ij}$ is in contact with the side surface b' of the conductive layer $C_{ij}$ and the side surface a' of the layer member $A_{ij}$ and in contact with the side surface b of the conductive layer $C_{i(j+1)}$ and the side surface a of the layer member $A_{i(j+1)}$. The insulating layer $K_{ij}$ is also in contact with the conductive layer $F_i$. Accordingly, the conductive layer $F_i$ continuously extends on the conductive layer $C_{i1}, C_{i2} \ldots C_{in}$ and the insulating layer $K_{i1}, K_{i2} \ldots K_{i(n-1)}$. The opposing side surfaces of the insulating layer $K_{ij}$, which determine the width of the insulating layer $K_{ij}$, are substantially aligned with the opposing side surfaces b an b' of the conductive layer $F_i$, respectively.

The conductive layer $F_i$ has formed thereon an insulating layer $G_i$. The insulating layer $G_i$ has the same width and length as those of the conductive layer $F_i$ and has a relatively large thickness of, for example, 0.3 μm. The insulating layer $G_i$ is formed of, for intance, an organic resin such as polyimide resin. The opposing side surfaces of the insulating layer $G_i$, which determine the wide of the insulating layer $G_i$, are substantially aligned with the opposing side surfaces b and b' of the conductive layer $F_i$, respectively.

The substrate 1 is deposted thereon with a relatively thin orienting and insulating layer 2 covering the conductive layers $C_{11}$ to $C_{1n}, C_{21}$ to $C_{2n} \ldots C_{m1}$ to $C_{mn}$, the layer members $A_{11}$ to $A_{1n}, A_{21}$ to $A_{2n} \ldots A_{m1}$ to $A_{mn}$, the insulating layers $K_{11}$ to $K_{1(n-1)}, K_{21}$ to $K_{2(n-1)} \ldots K_{m1}$ to $K_{m(n-1)}$, the conductive layers $F_1$ to $F_m$ and the insulating layers $G_1$ to $G_m$. The orienting and insulating layer 2 is formed of, for instance, alumina, silicon nitride or an organic resin such as polymide resin.

The substrate 1, the conductive layers $C_{11}$ to $C_{mn}$, the layer members $A_{11}$ to $A_{mn}$, the insulating layers $K_{11}$ to $K_{m(n-1)}$, the conductive layers $F_1$ to $F_m$, the insulating layers $G_1$ to $G_m$ and the orienting and insulating layer 2 make up a substrate member 3.

The substrate member 3 is formed, for example, as follows:

A conductive layer 10C which will ultimately form the conductive layers $C_{11}$ to $C_{mn}$, a conductive layer 111 which will ultimately form the conductive layers 11 of the layer members $A_{11}$ to $A_{mn}$, a layer member 112 which will ultimately form the layer members 12 of the layer members $A_{11}$ to $A_{mn}$ and a conductive layer 113 which will ultimately form the conductive layers 13 of the layer member $A_{11}$ to $A_{mn}$ are deposited in that order on the substrate 1, as shown in FIGS. 5A to 5E.

The conductive layer 10C may be formed by a known method, for instance, a sputtering or electron beam evaporation process. The conductive layer 111 may also be formed by a known method, for instance, the sputtering or electron beam evaporation process.

The layer member 112 also may be formed by a known method, for example, a CVD method, plasma CVD method, photo CVD method or the like.

In my experiment, the substrate 1 having formed thereon the conductive layers 10C and 111 was loaded through a loading and unloading chamber into a first reaction chamber, wherein a glow discharge was produced over the substrate 1 at a high frequency of 13.56 MHz in an atmosphere containing silane ($SiH_4$), phospine ($PH_3$) and hydrogen, with the substrate temperature held in the range of 200° to 300° C. As a result of this, an n-type non-single-crystal silicon layer, which had a conductivity of $10^{-7}$ to $10^{-4}$ $(\Omega cm)^{-1}$ and contained hydrogen as a recombination center neutralizer, was deposited 500 to 700 Å thick on the conductive layer 111. Next, the substrate 1 was moved from the first reaction chamber into the next second reaction chamber, wherein a gas mixture of silane ($Si_mH_{2m+2}$) (where m = 1, 2, 3, . . . ) (for example, $SiH_4$) and methyl silane ($SiH_n(CH_3)_{4-n}$) (where n = 1, 2, 3) was discharged into a plasma, by which an i-type non-single-crystal semiconductor layer of $Si_xC_{1-x}$ (where $0.5 < x \leq 1$) was deposited 2500 to 5500 Å thick on the n-type non-single-crystal silicon layer. After this, the substrate 1 was returned from the second reaction chamber to the first reaction chamber, wherein another n-type non-single-crystal silicon layer similar to the above n-type non-single-crystal Si layer was deposited 1000 to 1500 Å thick by the same method on the i-type non-single-crystal silicon silicon layer, thus obtaining the laminate member 112 having the n-i-n type structure. In the laminate member 112 having the n-i-n type structure, the n type layer may also be formed of $Si_3N_{4-x}$ ($0 < x \leq 4$) or $SiO_{2-x}$ ($0 < x < 1$).

The conductive layer 113 may also be formed by a known method, for instance, the sputtering or electron beam evaporation process.

The conductive layer 111, the layer member 112 and the conductive layer 113 make up a layer member 10A. The conductive layer 10C and the layer member 10A make up a layer member 100.

Next, the layer member 100 is subjected to a known patterning process using a first mask, providing m×n layer members $B_{11}$ to $B_{mn}$ of the same pattern as the conductive layers $C_{11}$ to $C_{mn}$, as shown in FIGS. 6A to 6E. As the result of this, the conductive layers $C_{11}$ to $C_{mn}$ are obtained from the conductive layer 10C. The layer member $B_{ij}$ is a laminate member of the conductive layer $C_{ij}$ and the layer member $D_{ij}$ which will ultimately form the layer member $A_{ij}$.

Next, a photosensitive organic resin layer 20K which will ultimately form the insulating layer $K_{ij}$ is formed on the substrate 1 to cover the layer members $B_{11}$ to $B_{mn}$ by coating, for example, commercially available photosensitive polyimide resin on the substrate 1, as shown in FIGS. 7A to 7E. The photosensitive polyimide resin is an precursor of polyimide resin and becomes polyimide resin upon exposure to light.

Next, the photosensitive organic resin layer 20K is heat-hardened, as required, for example, at 80° C. for 60 minutes, providing from the photosensitive organic resin 20K, a heat-hardened photosensitive organic resin layer 21K, as shown in FIGS. 8A to 8E. The heat-hardened photosensitive organic resin layer 21K is thinner than the original photosensitive resin layer 20K.

Next, the heat-hardened photosensitive resin layer 21K is exposed to light 23, for instance, ultraviolet rays of a 300 to 400 nm wavelength, which is directed form the side of the light transparent substrate 1, as indicated in FIGS. 9A to 9E. In this instance, a portion 22a of the photosensitive resin layer 21K, which does not lie on the layer member $B_{11}$ to $B_{mn}$ is exposed to a larger amount of light than the remaining portions 22b of the resin layer 21K, which lie on the layer member $B_{11}$ to $B_{mn}$.

Next, the photosensitive resin layer 21K thus exposed to light 23 is developed using a commercially available liquid developer, removing the portion 22b of the photosensitive resin layer 21K lying on the layer members $B_{11}$ to $B_{mn}$, as depicted in FIGS. 10A to 10E. This development generally includes a step of dipping the exposed photosensitive resin layer 21K, or spraying the liquid developer on the resin layer 21K, and a step of rinsing the developed layer with isopropanol or like commercially available detergent. By subjecting the photosensitive resin layer 21K to such treatments as described above, the organic resin layer 24K is obtained which has substantially no photosensitivity.

Next, the organic resin layer 21K is hardened by heating, for example, at 135° to 400° C. for 30 minutes, obtaining a heat-hardened organic resin layer as the insulating layer 25K, as depicted in FIGS. 11A to 11E. The insulating layer 25K is thinner than the organic resin layer 24K. The insulating layer 25K can be formed to the substantially the same thickness as those of the layer members $B_{11}$ to $B_{mn}$ by selecting the thickness of the original photosensitive organic resin layer 20K to a suitable value larger than the thickness of the layer members $B_{11}$ to $B_{mn}$.

Next, a conductive layer 30F which will ultimately form the conductive layers $F_1$ to $F_m$ and an insulating layer 40G which will ultimately form the insulating layer $G_1$ to $G_m$ are deposited in that order all over the substrate 1 to cover the laminate member $B_{11}$ to $B_{mn}$ and the insulating layer 25K as shown in FIGS. 12A to 12E.

The conductive layer 30F may be formed by a known method, for example, the sputtering or electron beam evaporation process, to a thickness of, for instance, 100 to 300 nm. The insulating layer 40G may be formed by a known deositing method.

Next, the insulating layer 40G, the conductive layer 40F, the layer members $D_{11}$ to $D_{mn}$ of the layer members $B_{11}$ to $B_{mn}$ are patterned by a known method using a second mask into the insulating layers $G_1$ to $G_m$, the conductive layers $F_1$ to $F_m$, the layer members $A_{11}$ to $A_{mn}$ and the insulating layers $K_{11}$ to $K_{m(n-1)}$ as shown in FIGS. 13A to 13E. In this case, the conductive layer $C_{11}$ to $C_{mn}$ are not patterned.

Next, the thin orienting and insulating layer 2 is deposited on the substrate 1 to cover the insulating layer $G_1$ to $G_m$, the conductive layers $F_1$ to $F_m$, the layer members $A_{11}$ to $A_{mn}$, the conductive layer $C_{11}$ to $C_{mn}$ and the insulating layers $K_{11}$ to $K_{m(n-1)}$.

Referring now back to FIGS. 1A to 1E, another substrate member 8 is provided which is different from the aforementioned substrate member 3.

The substrate member 8 has, on a transparent substrate 5 corresponding to the substrate 1, a plurality n of sequentially arranged sheet-like optical filters $S_1$, $S_2$, ... $S_n$ which extend in the column direction. The filters $S_1$, $S_4$, $S_7$..., ; $S_2$, $S_5$, $S_8$...,; and $S_3$, $S_6$, $S_9$... may be red filters; green filters; and blue filters, respectively. The filter $S_j$ has substantially the same width as do the conductive layers $C_{ij}$ to $C_{mj}$.

The filter $S_1$, $S_2$, ... $S_n$ have formed thereon column conductive layers $H_1$, $H_2$, ... $H_n$. The conductive layers $H_1$ to $H_n$ are transparent and are formed of, for instance, indium tin oxide or tin oxide. The filters $S_j$ and the conductive layer $H_j$ make up a layer member. This layer member can be obtained by a known method using a third mask.

The substrates 5 is deposited with an orienting and insulating layer 6 formed of, for instance, almina, silicon nitride or an organic region such as polyimide resin by a known method, for example, coating, to cover the filters $S_1$ to $S_n$ and the conductive layer $H_1$ to $H_n$.

The substrate member 8 is disposed upside down by a suitable support means (not shown) in opposing relation to the top of the substrate member 3 in parallel thereto. In this instance, the conductive layers $C_{ij}$ to $C_{mj}$ of the substrate member 3 and the column conductive layer $H_j$ of the substrate member 8 are held face-to-face with each other. The substrate member 3 and 8 define a space 3 μm or less, preferably 2 μm or less, for example 1.0 μm±0.5 μm in height between that part of the surface of the substrate member 3 under which the part 14 of the conductive layer $C_{ij}$ lies and that part of the surface of the substrate member 8 under which the part 15 of the conductive layer $H_j$ lies. The part 14 of the conductive layer $C_{ij}$ is a portion not forming the layer $H_j$ is a portion confronting the part 14 of the conductive layer. In practice, the orienting and insulating layer 2 and 6 are in contact with each other, shown in FIGS. 1A to 1E.

A space defined by the substrate members 3 and 8 is filled with ferroelectric liquid crystal 9. *ro The ferroelectric liquid crystal 9 is orientated by a known suitable method. In this instance, the orienting an insulating layers 2 and 6 of the substrate members 3 and 8 contribute to the orientation of the ferroelectric liquid crystal 9.

In the structure described above in conjunction with FIGS. 1A to 1E, the part 14 of the conductive layer $C_{ij}$ on the substrate 1, on which the laminate layer $A_{ij}$ does not extend, the part 15 of the conductive layer $H_j$ on the substrate 5, which faces the part 14 of the conductive layer $C_{ij}$ and the part 16 of the ferroelectric liquid crystal 9 between the part 14 of the conductive layer $C_{ij}$ and the part 15 of the conductive layer $H_j$ constitute a ferroelectric liquid crystal element $L_{ij}$ which employs the part 14 of the conductive layer $C_{ij}$ and the part 15 of the conductive layer $H_{ij}$ as its electrodes. When low voltage is applied across the conductive layers $C_{ij}$ and $H_j$, the ferroelectric liquid crystal element $L_{ij}$ remain opaque, but when high voltage is applied, it becomes transparent.

Figure 2:
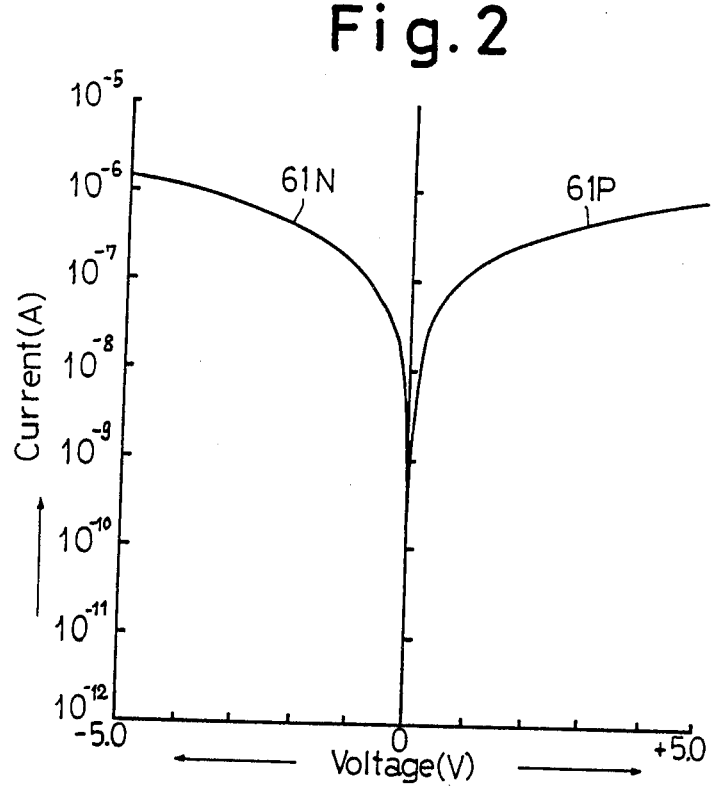
FIG. 2 is a graph showing the voltage (V)-current(I) characteristics of the nonlinear element used in the liquid crystal display panel of the present invention.

The layer member $A_{ij}$ constitutes a nonlinear element $U_{ij}$ which employs the conductive layers 11 and 13 as its electrodes. The nonlinear element $U_{ij}$ presents such a nonlinear voltage (V)-current(A) characteristics as shown curves 61P and 61N in FIG. 2. The nonlinear element $U_{ij}$ has an offset voltage which is intermediate between the voltages that make the liquid crystal element $L_{ij}$ transparent and nontransparent, respectively.

The conductive layer 13 of the layer member $A_{ij}$ is in contact with the conductive layer $C_{ij}$. Therefore, the liquid crystal element $L_{ij}$ and the nonlinear element $U_{ij}$ are connected in series with each other, and hence make up a liquid crystal display cell $M_{ij}$.

Figure 3:
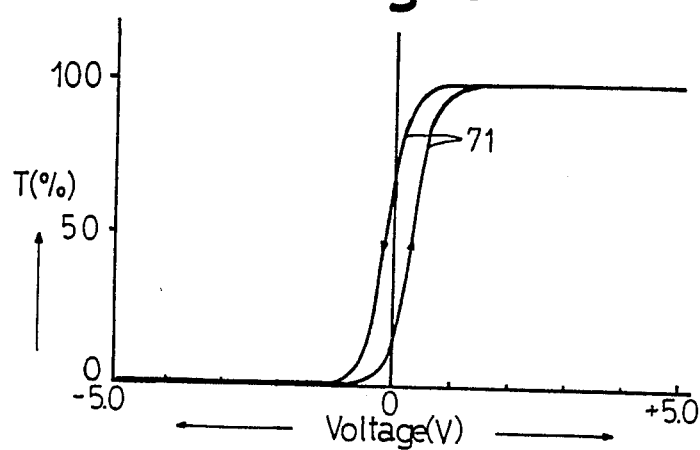
FIG. 3 is a graph showing the voltage (V)-transmittance (T) of the light of the crystal display panel of the present invention.

According to the arrangement described above with respect to FIGS. 1A to 1E, the conductive layer 11 of the layer member $A_{ij}$ and according the nonlinear element $U_{ij}$ is connected to the row coductive layer $F_i$. The substrates 1 and 5 and the conductive layers $H_j$ and $C_{ij}$ are transparent. Furthermore, the red filters $S_1$, $S_4$, $S_n$...; the green filters $S_2$, $S_5$, $S_8$ $S_{11}$...; and the blue filters $S_3$, $S_6$, $S_9$... are disposed under the column conductive layers $H_1$, $H_4$, $H_7$ $H_{10}$...; $H_2$, $H_5$, $H_8$...; and $H_3$, $H_6$, $H_9$...; respectively. According to the arrangement described above in conjunction with FIGS. 1A to 1E, such a relationship as shown by curve 71 in FIG. 3 is obtained between the voltage (V) which is applied across the conductive layers $F_i$ and $H_j$ and the transmittance (T) of light which enters from the side of the substrate member 8 to the substrate member 3 or vice versa.

Figure 4:
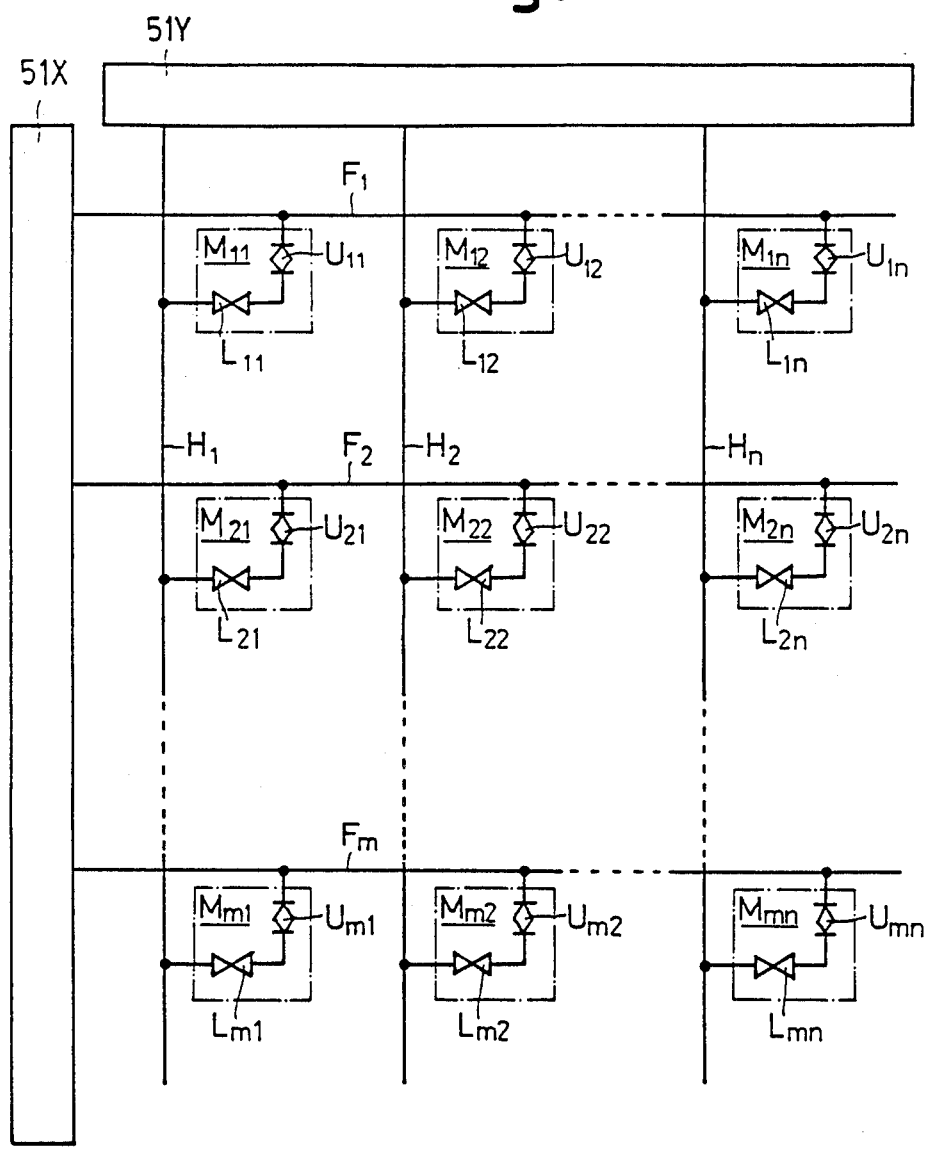
FIG. 4 is an electrical connection diagram of the liquid crystal display panel of the present invention.
Figure 5A:
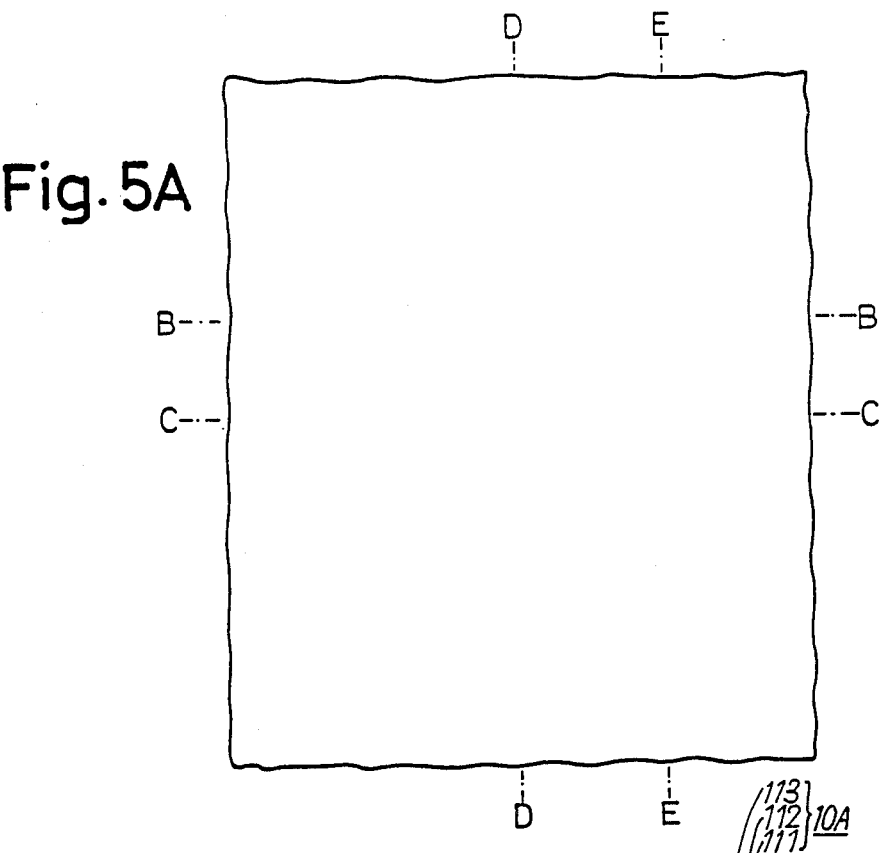
FIGS. 5A~5E to 14A~14E are a diagrams for explaining the manufacture of the liquid crystal display panel depicted in FIGS. 1A to 1E by the method of the present invention.
Figure 5B:
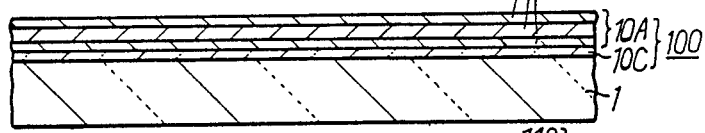
Figure 5C:
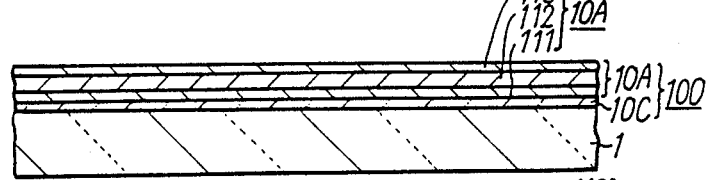
Figure 5D:
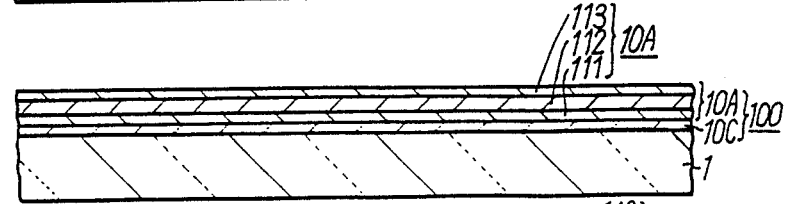
Figure 5E:
Figure 6A:
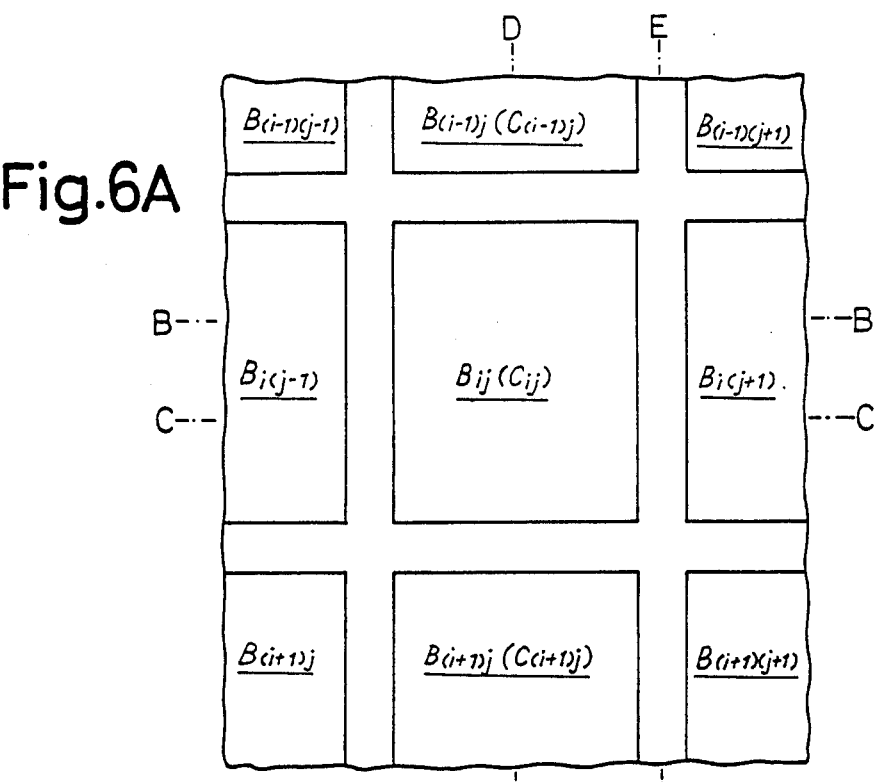
Figure 6B:
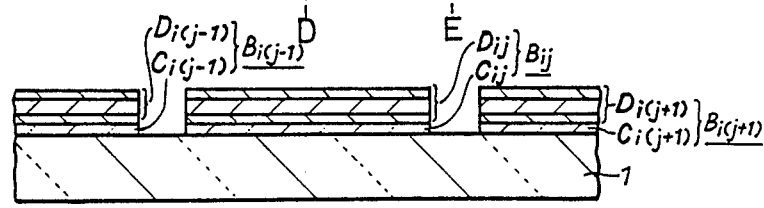
Figure 6C:
Figure 6D:
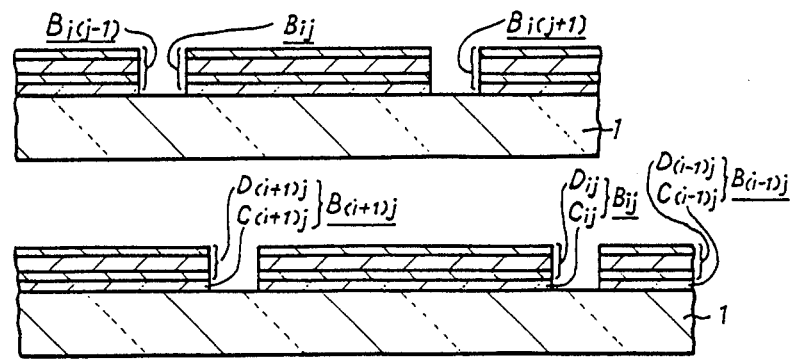
Figure 6E:
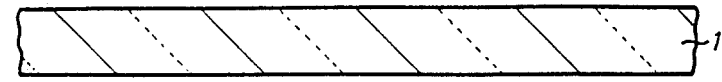
Figure 7A:
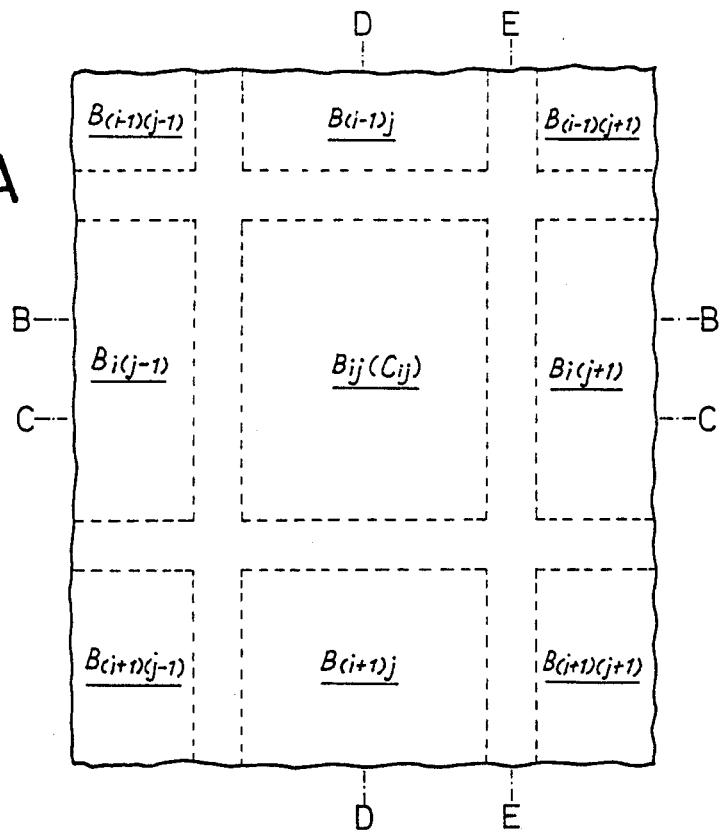
Figure 7B:
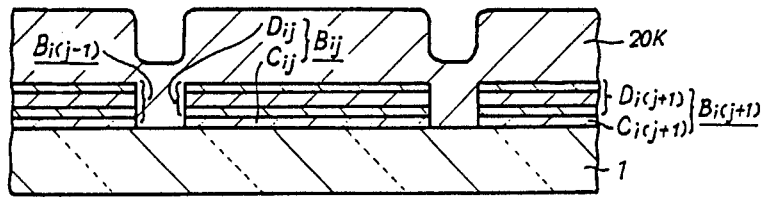
Figure 7C:
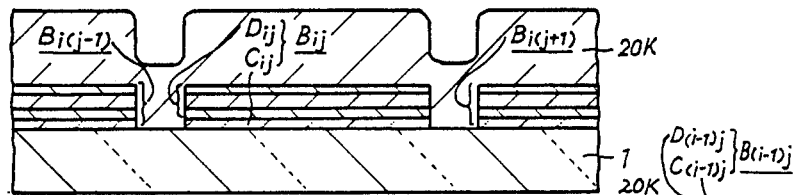
Figure 7D:
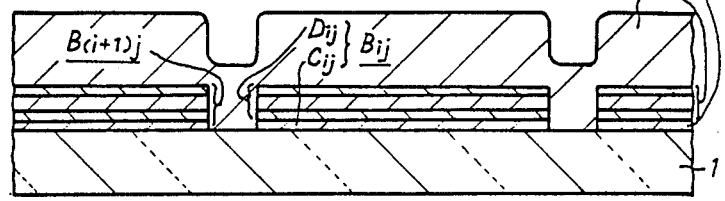
Figure 7E:
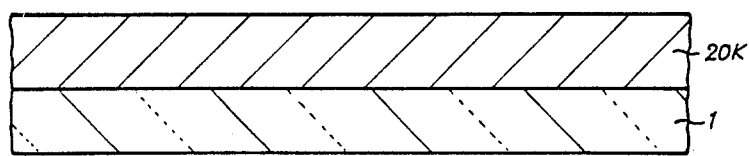
Figure 8A:
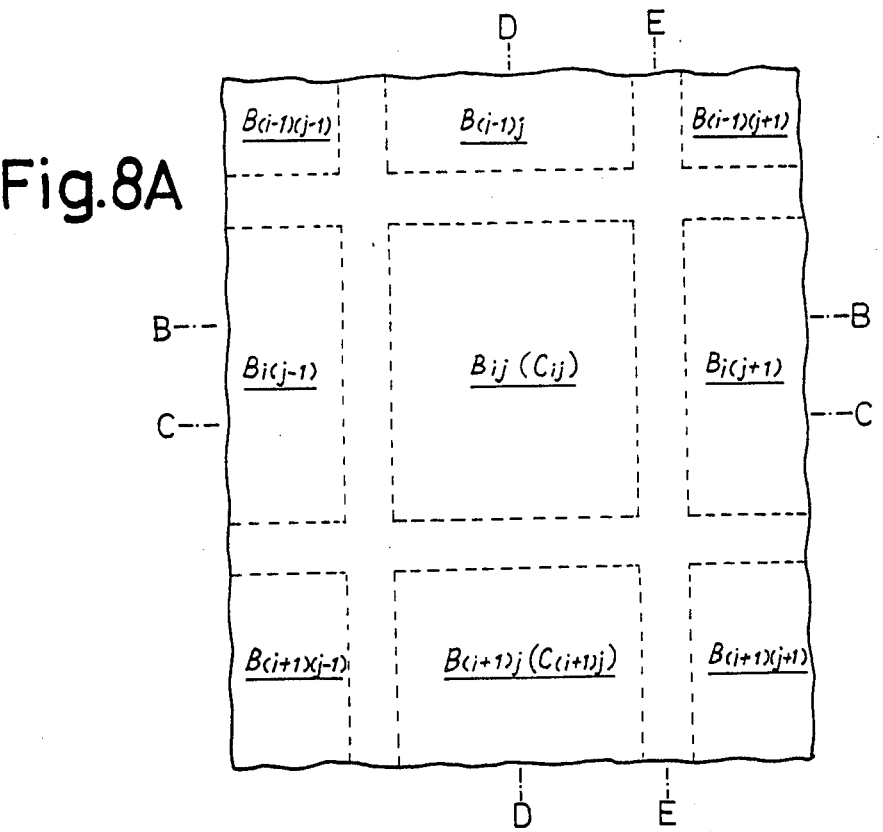
Figure 8B:
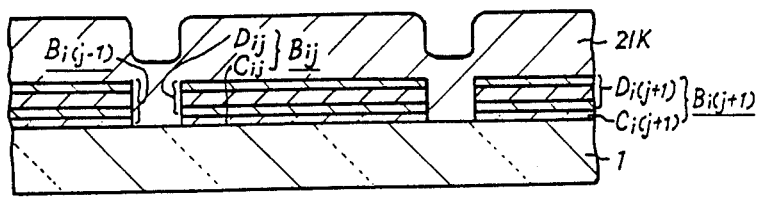
Figure 8C:
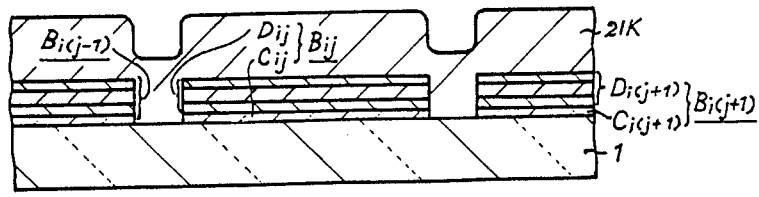
Figure 8D:
Figure 8E:
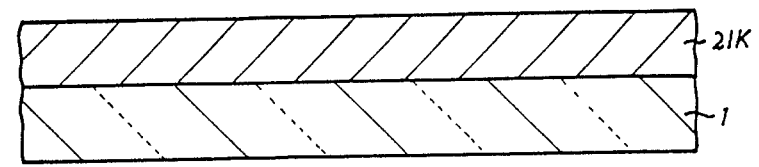
Figure 9A:
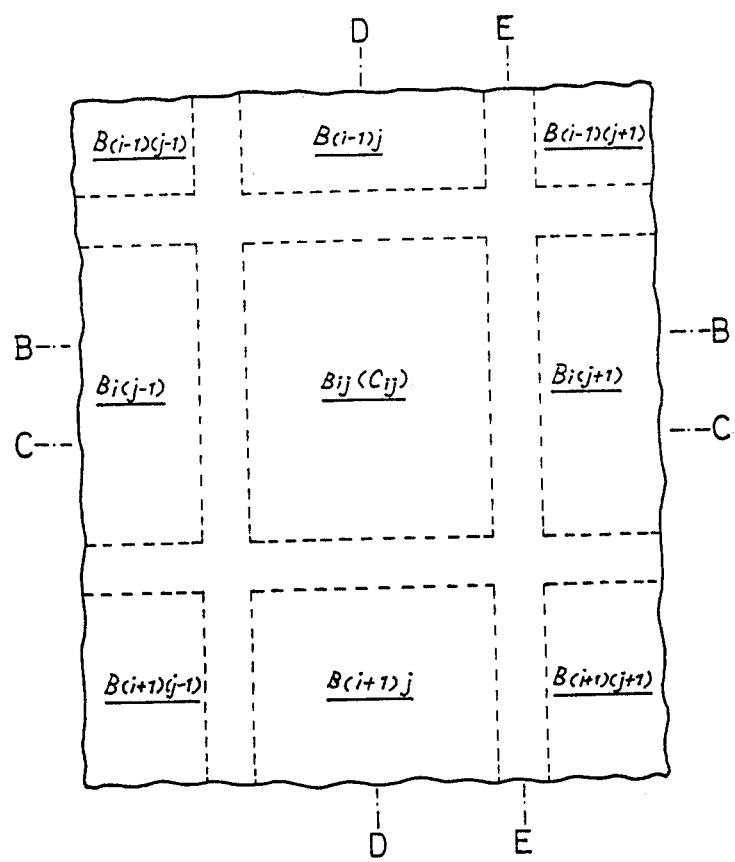
Figure 9B:
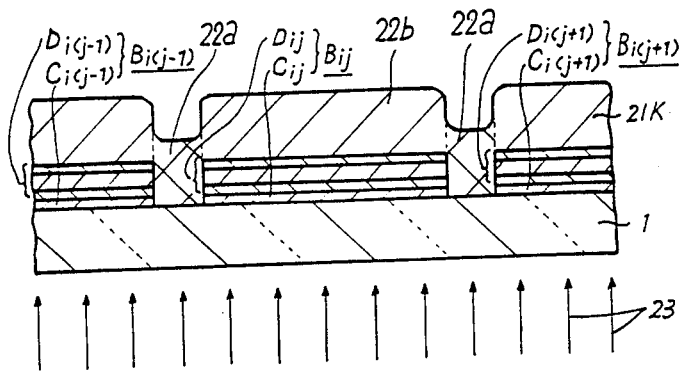
Figure 9C:
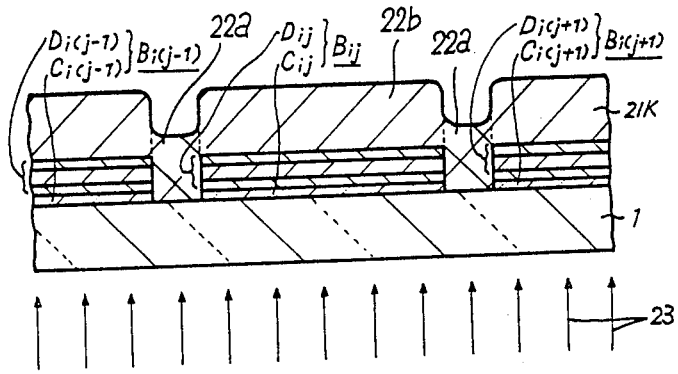
Figure 9D:
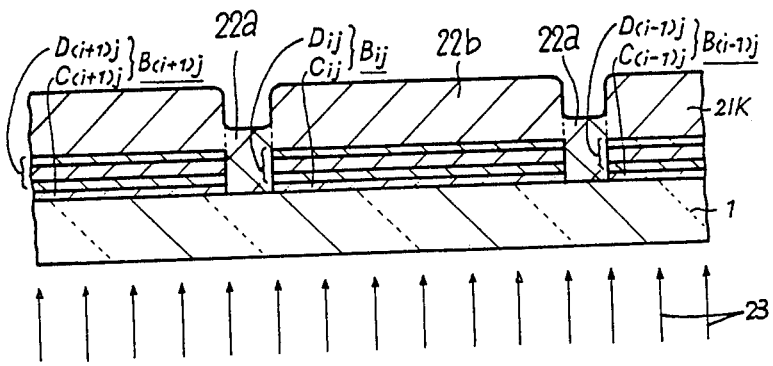
Figure 9E:
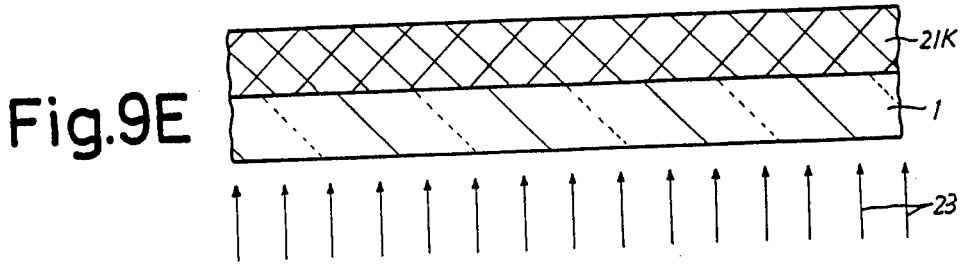
Figure 10A:
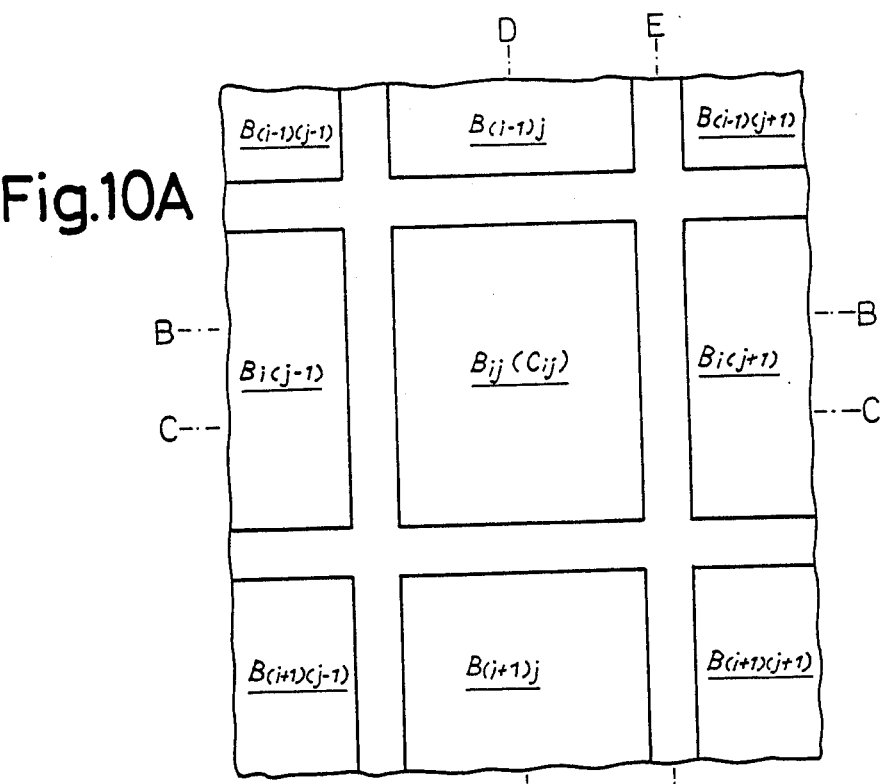
Figure 10B:
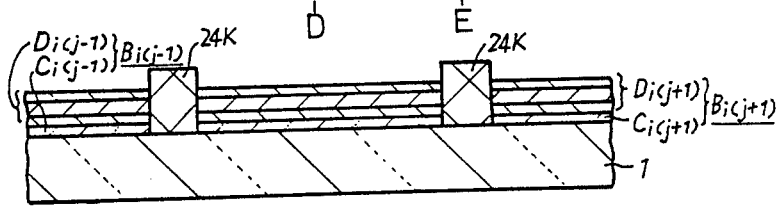
Figure 10C:
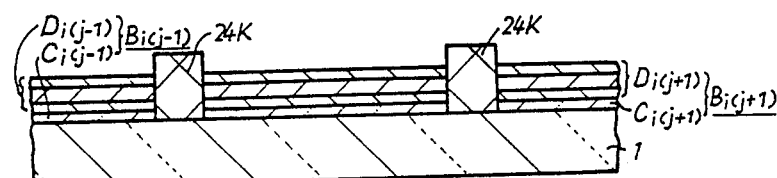
Figure 10D:
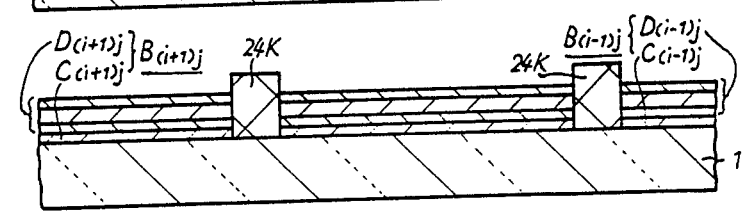
Figure 10E:
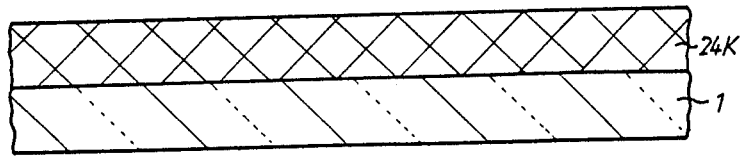
Figure 11A:
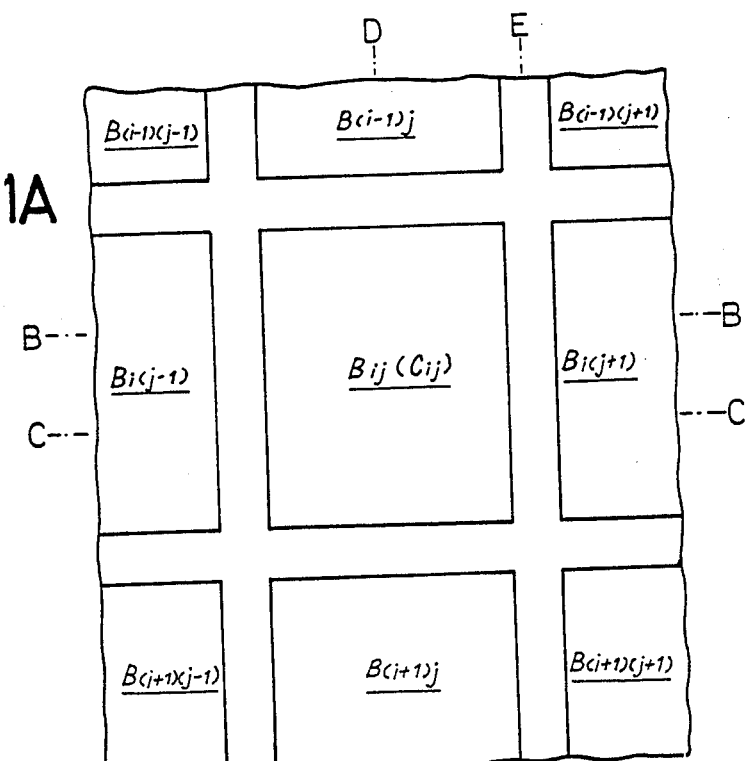
Figure 11B:
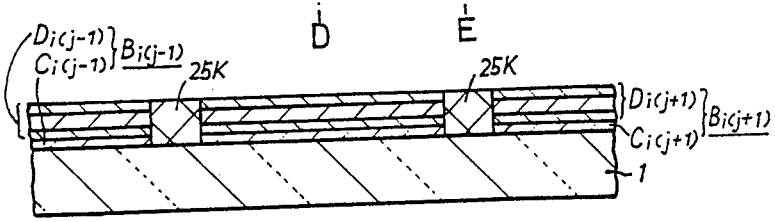
Figure 11C:
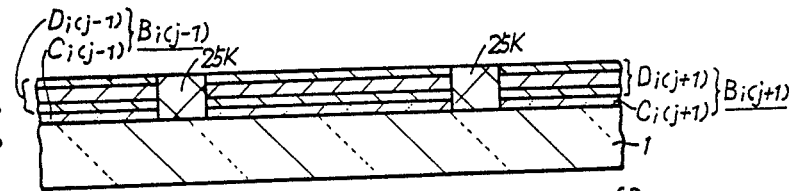
Figure 11D:
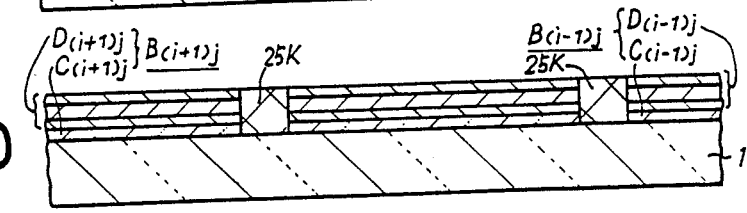
Figure 11E:
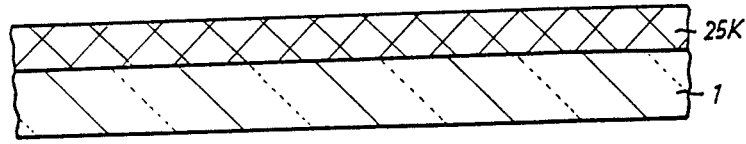
Figure 12A:
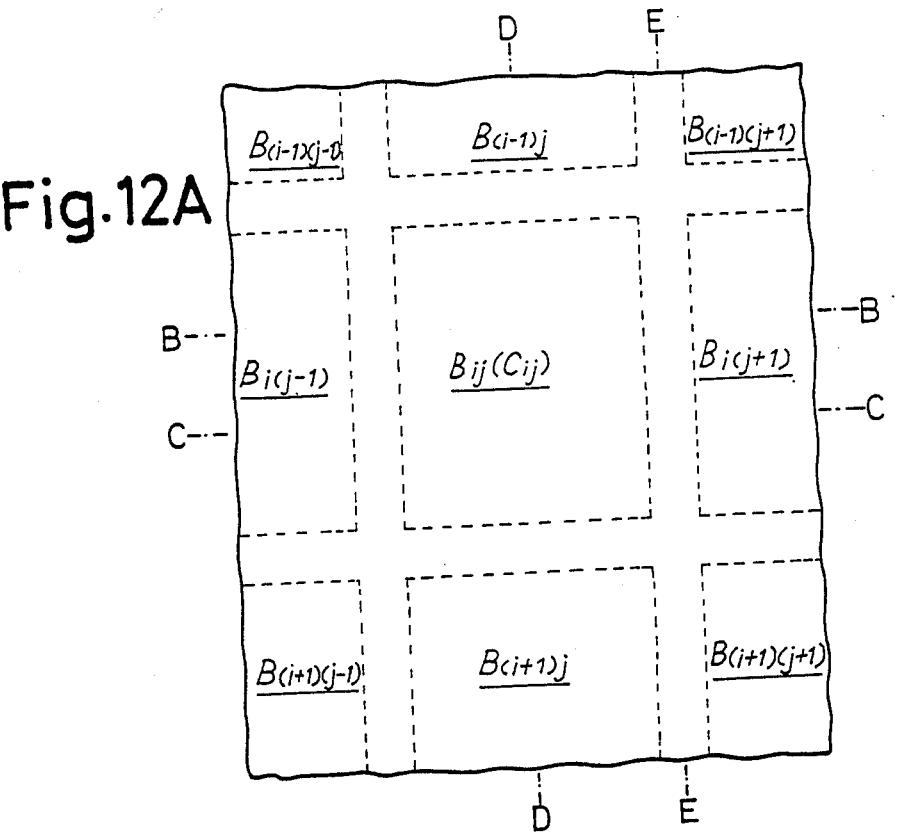
Figure 12B:
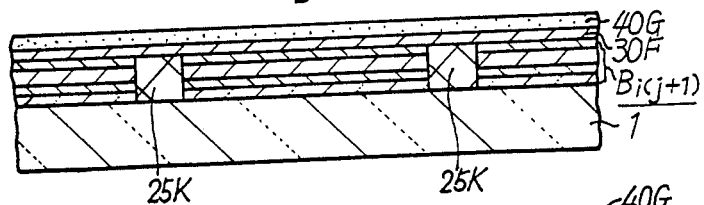
Figure 12C:
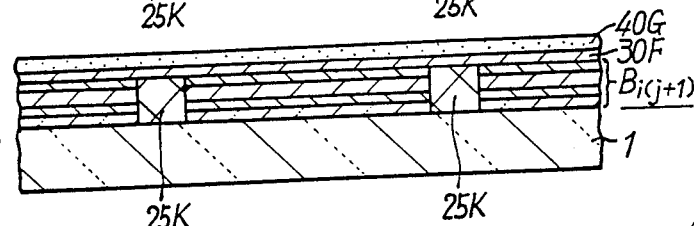
Figure 12D:
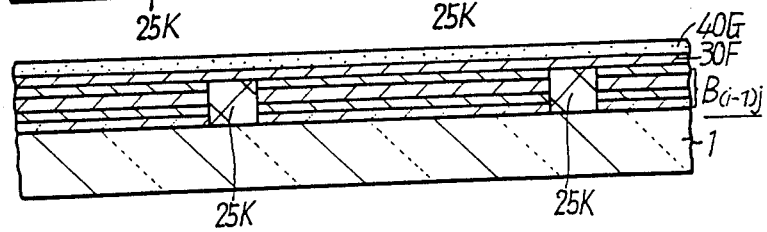
Figure 12E:
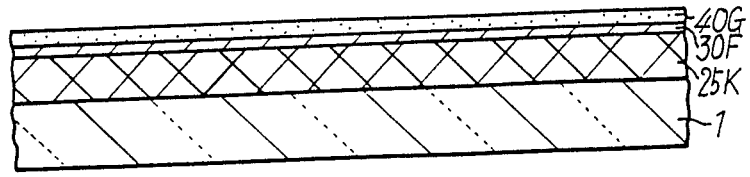
Figure 13A:
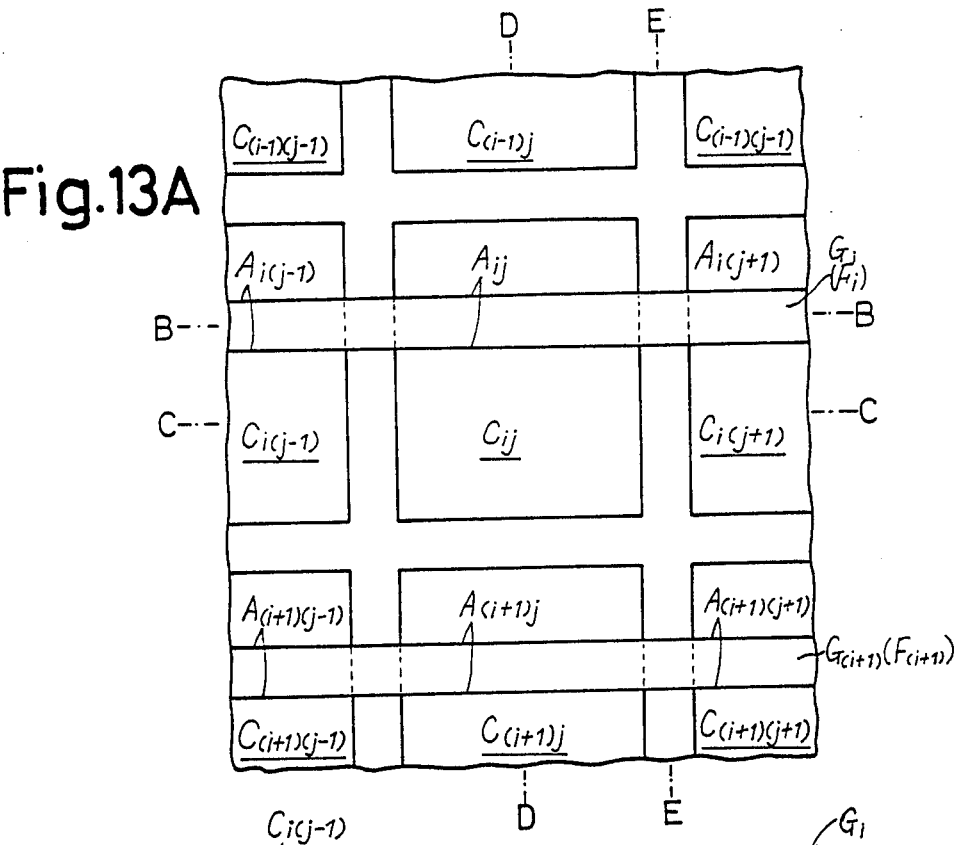
Figure 13B:
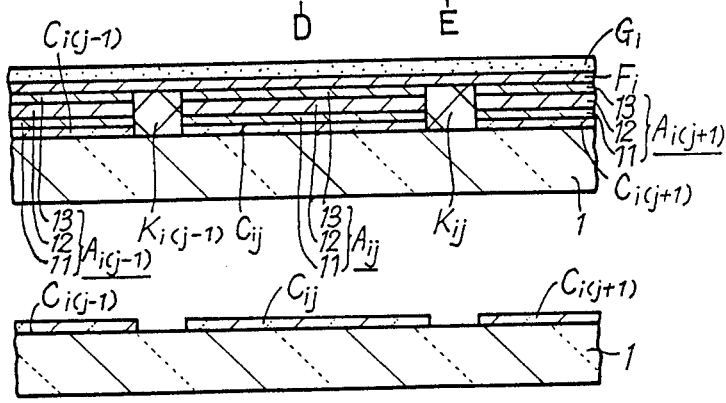
Figure 13C:
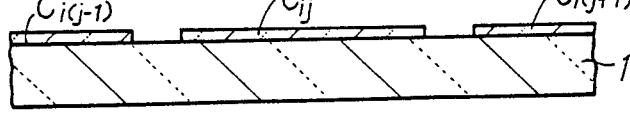
Figure 13D:
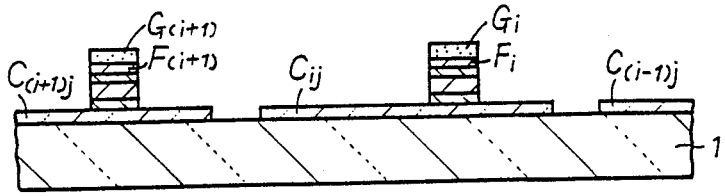
Figure 13E:
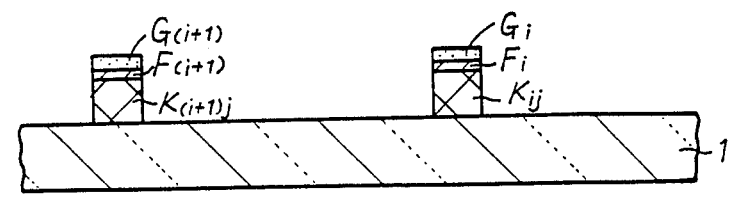
Figure 14A:
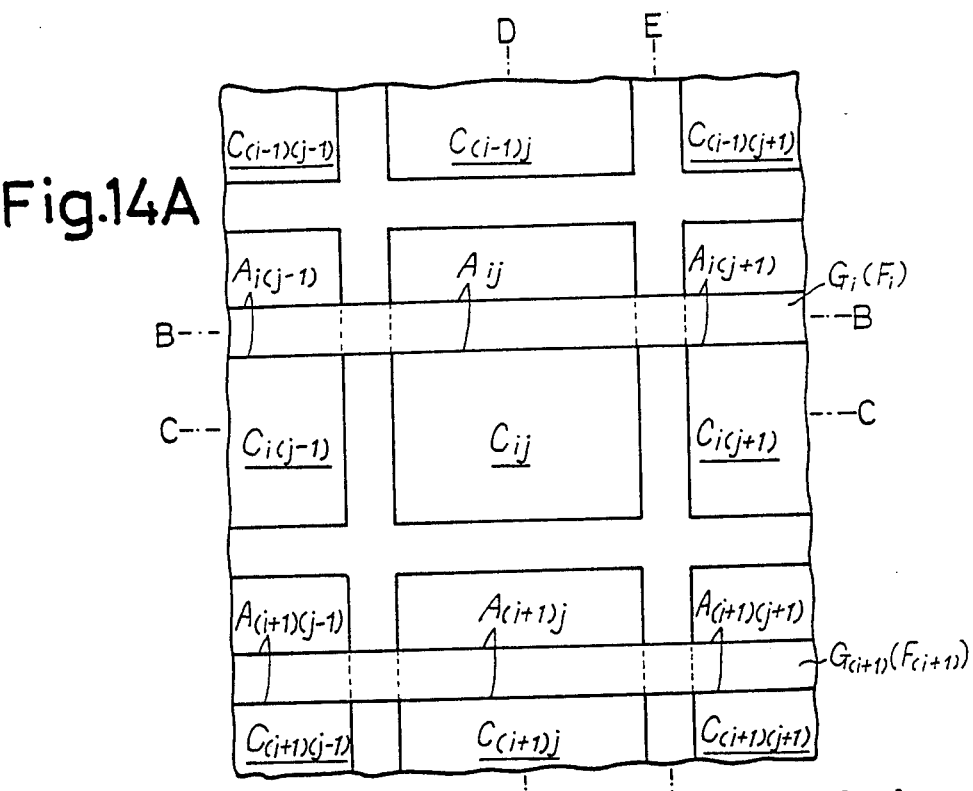
Figure 14B:
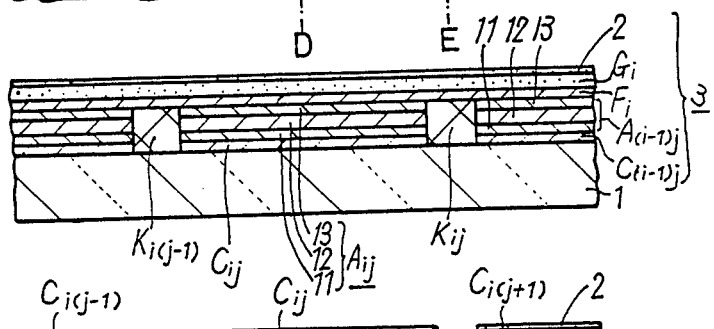
Figure 14C:
Figure 14D:
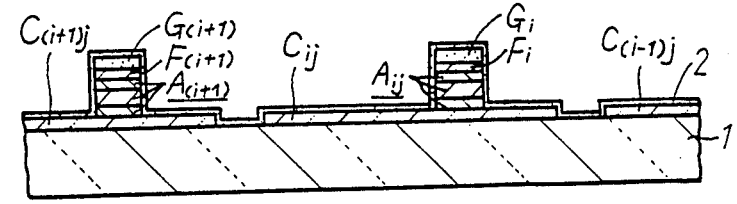
Figure 14E:
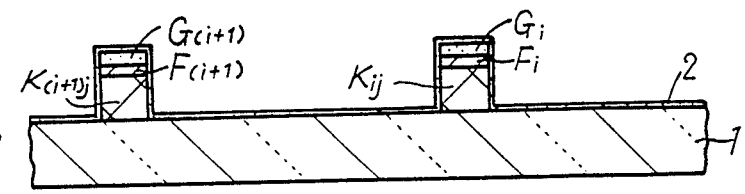
Figure 15A:
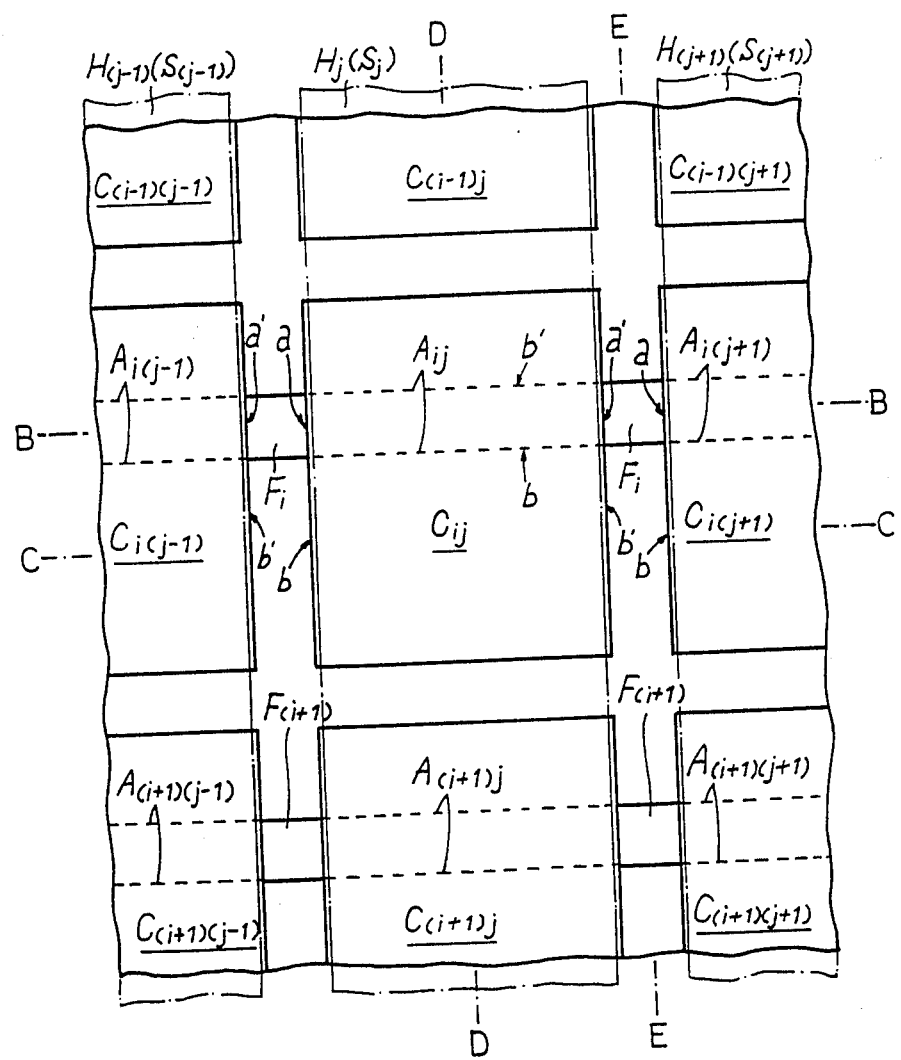
FIG. 15A is a plan view schematically illustrating another embodiment of the liquid crystal display panel of the present invention.
Figure 15B:
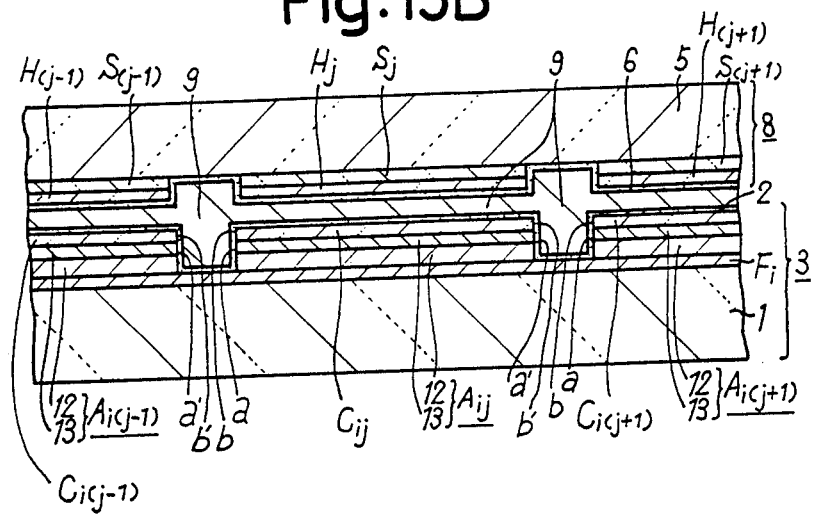
FIGS. 15B, 15C and 15E are sectional views respectively taken on the lines B—B, C—C, D—D and E—E in FIG. 15A.
Figure 15C:
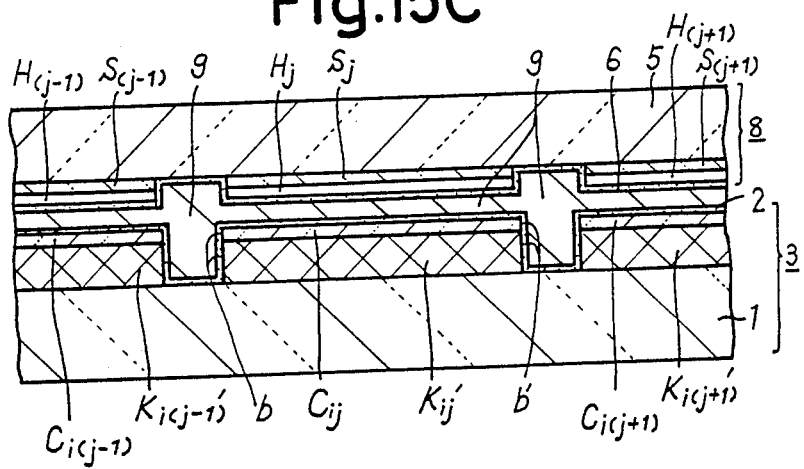
Figure 15D:
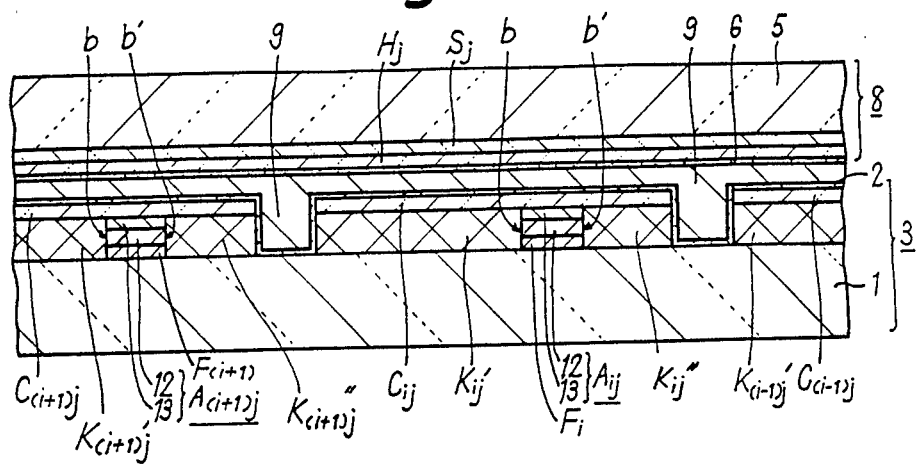
Figure 15E:
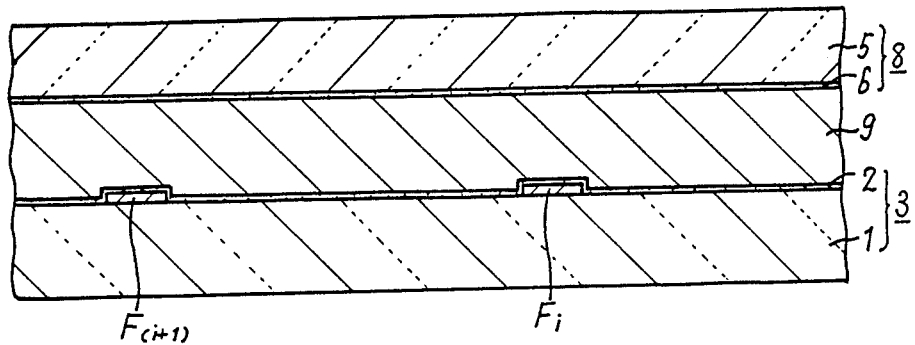
Figure 16A:
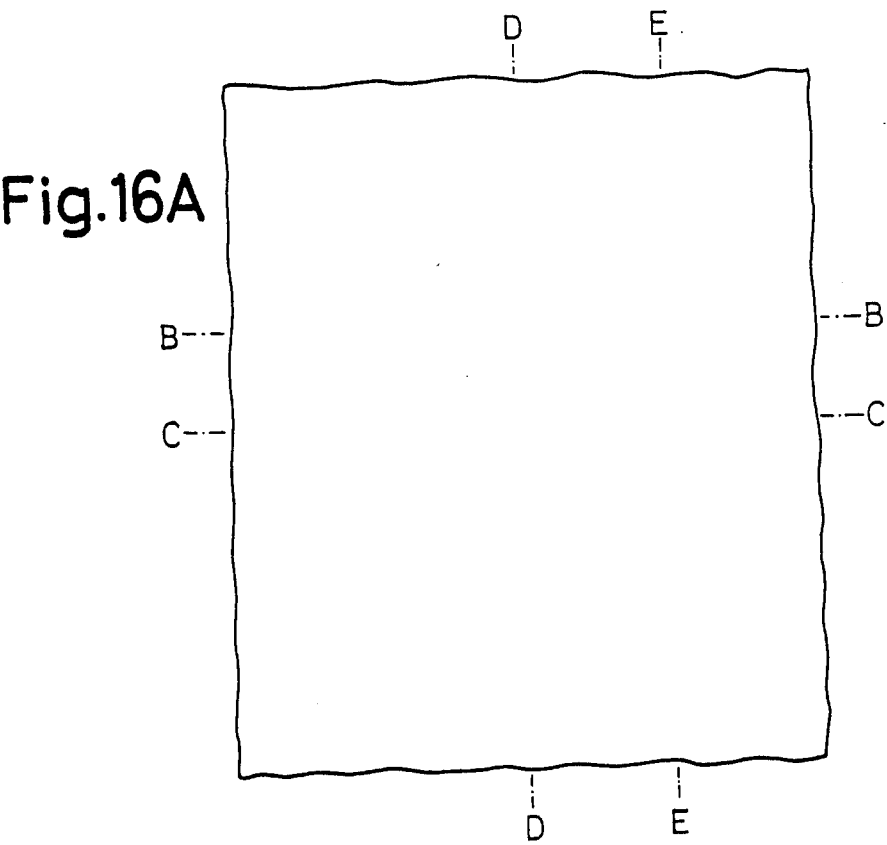
Figure 16B:
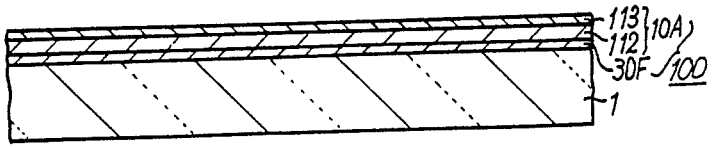
Figure 16C:
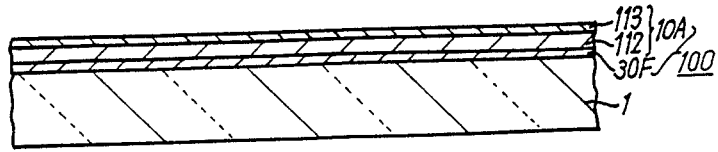
Figure 16D:
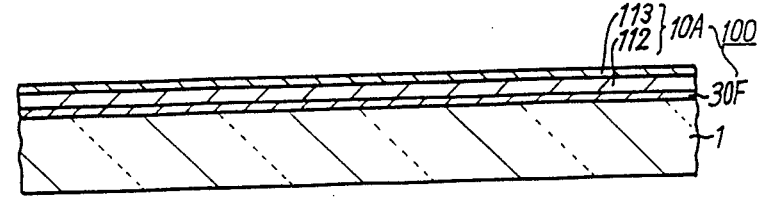
Figure 16E:
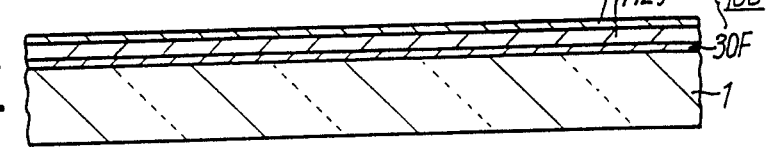
Figure 17A:
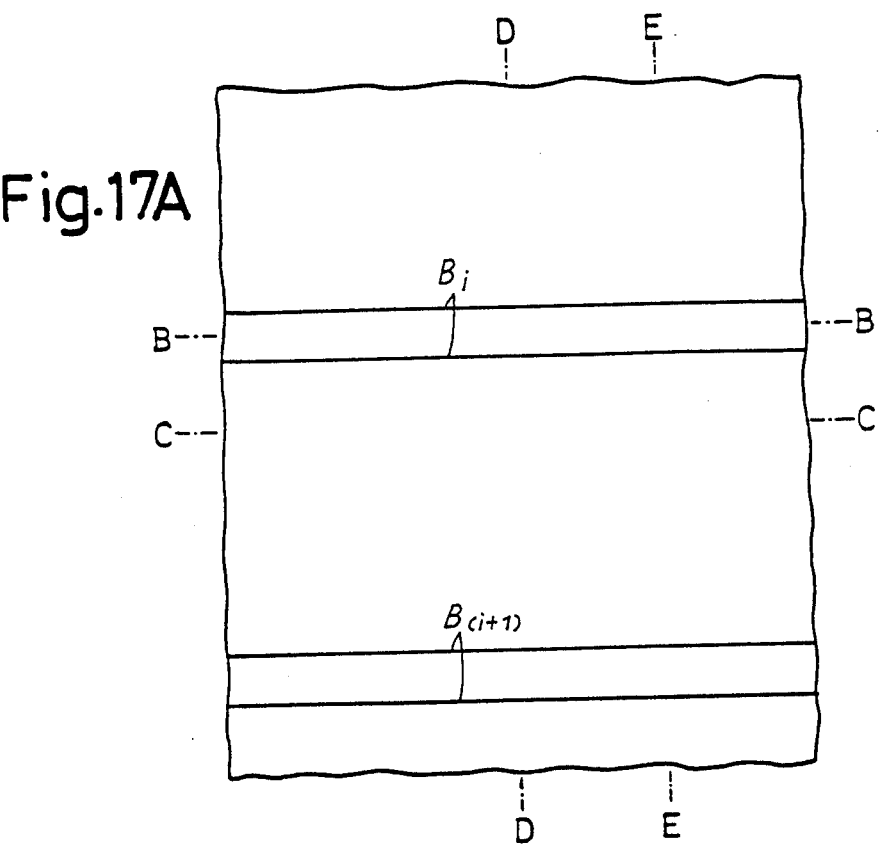
Figure 17B:
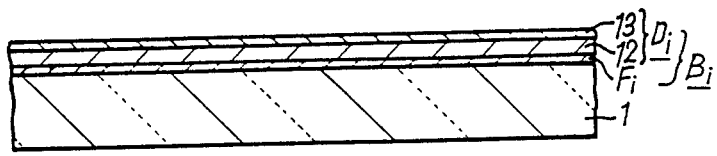
Figure 17C:
Figure 17D:
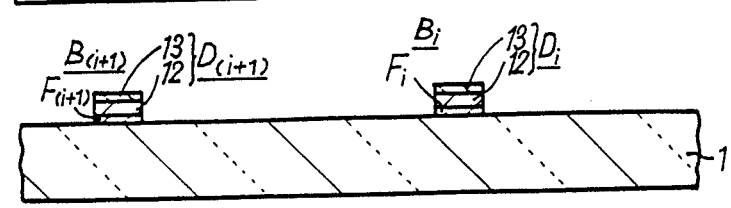
Figure 17E:
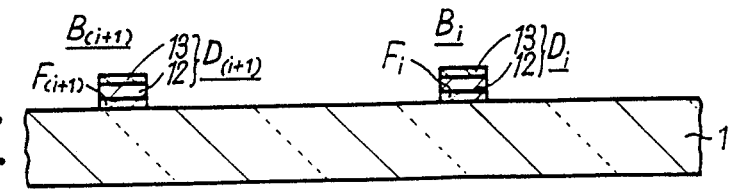
Figure 18A:
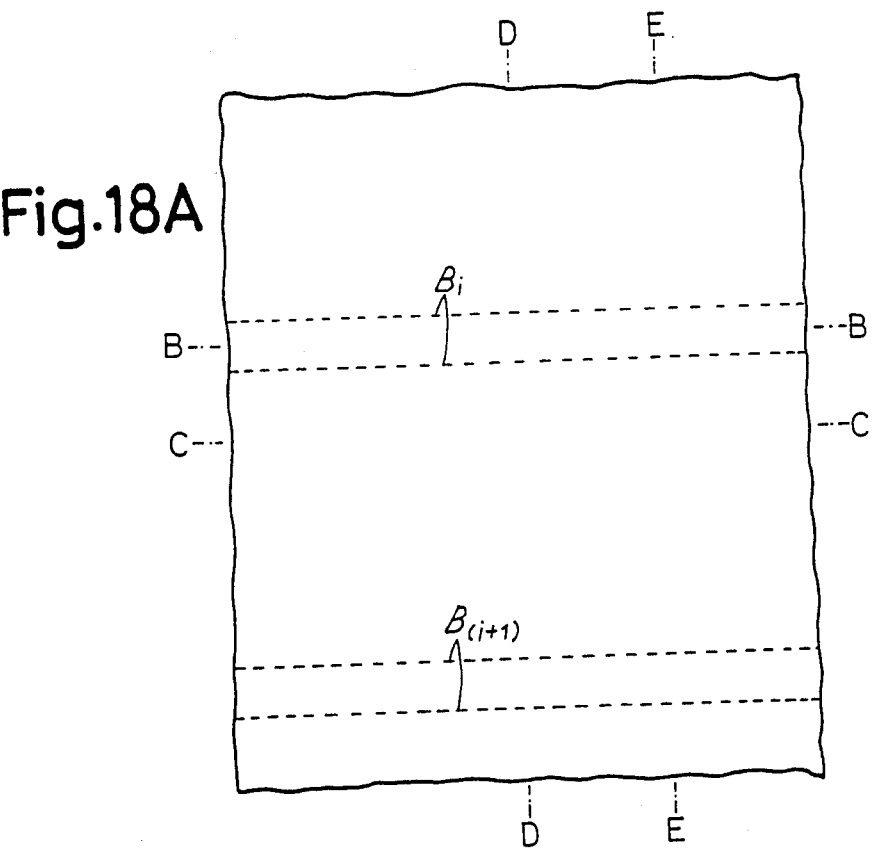
Figure 18B:
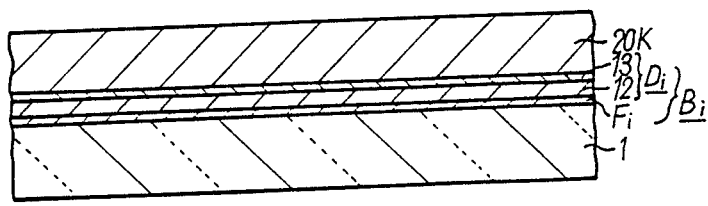
Figure 18C:
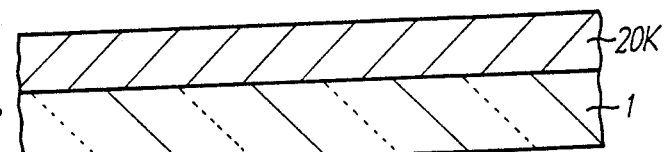
Figure 18D:
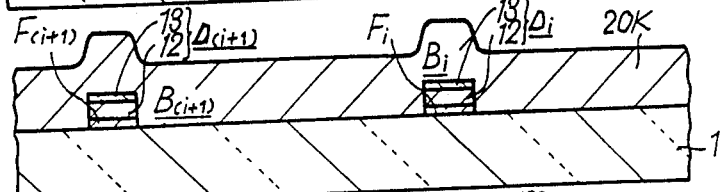
Figure 18E:
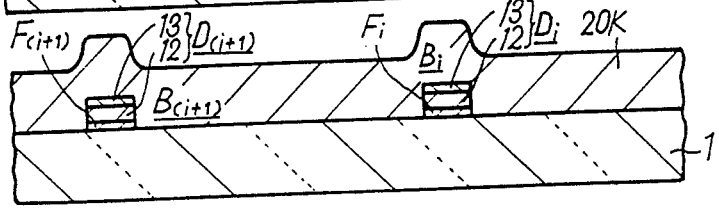
Figure 19A:
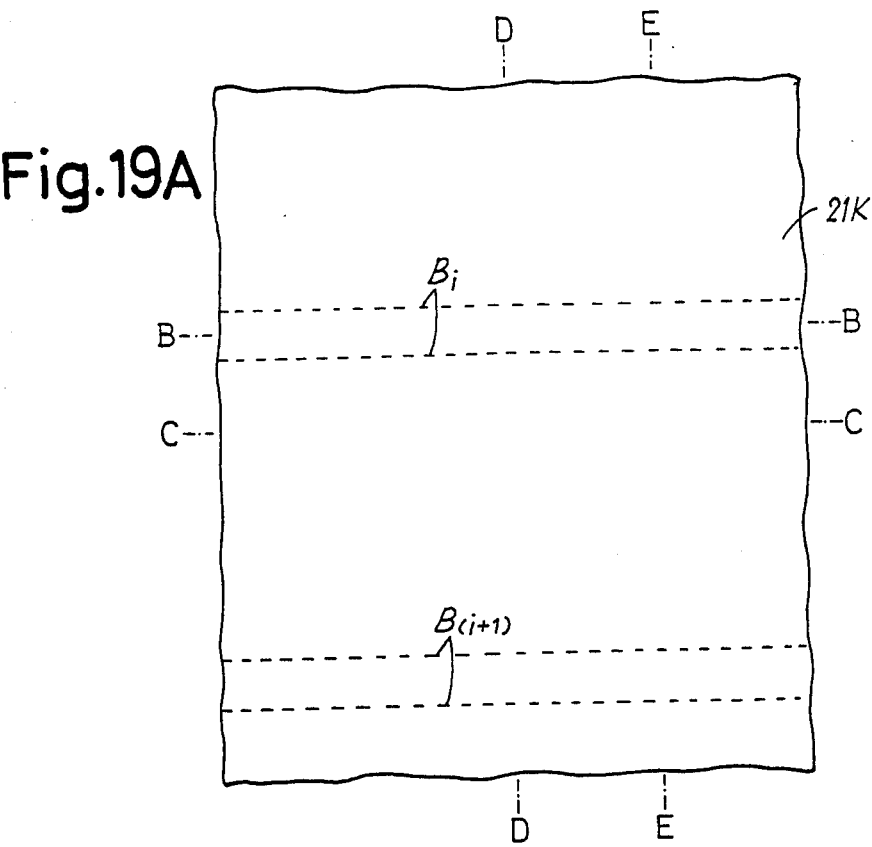
Figure 19B:
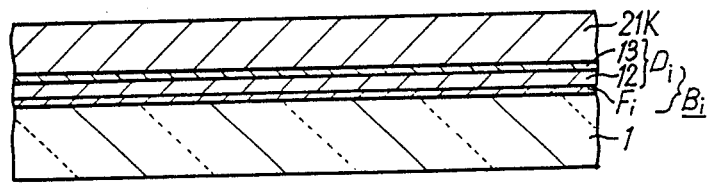
Figure 19C:
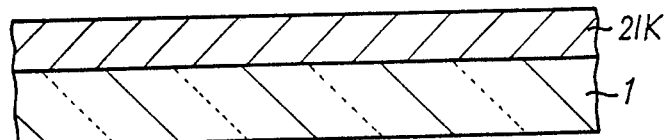
Figure 19D:
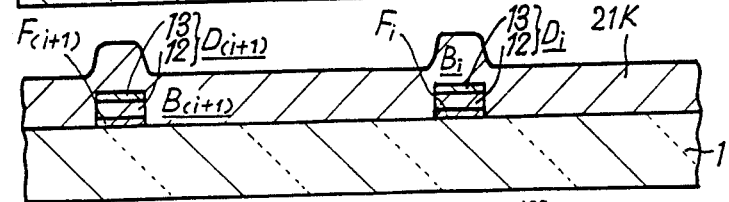
Figure 19E:
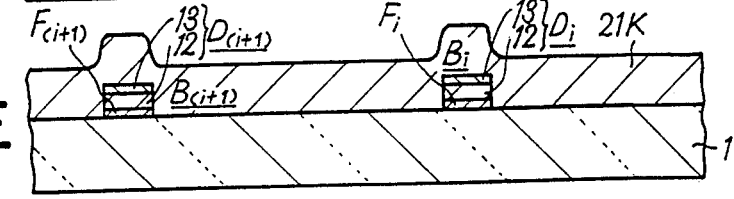
Figure 20A:
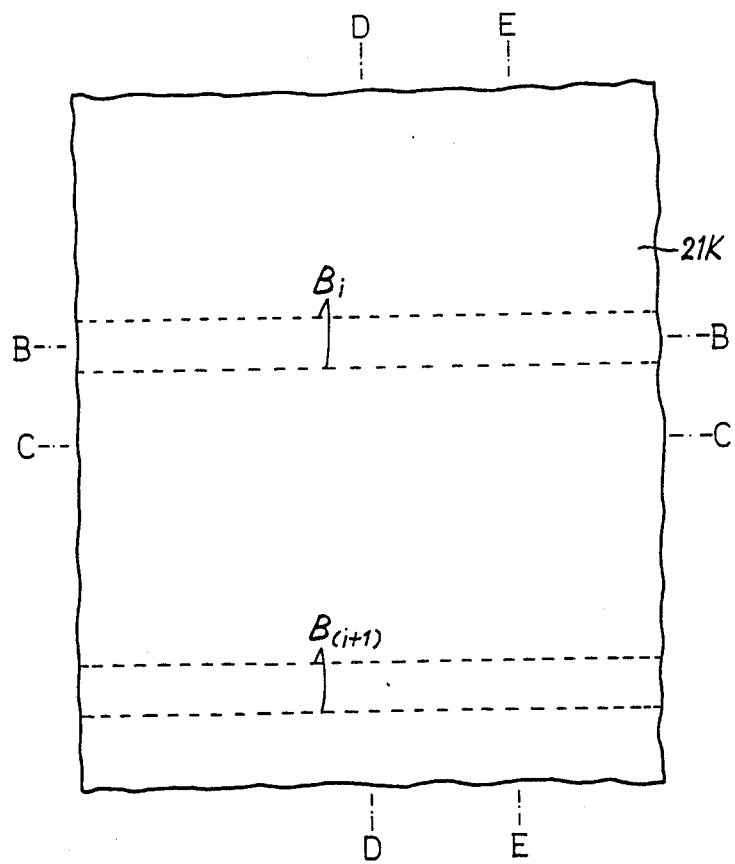
Figure 20B:
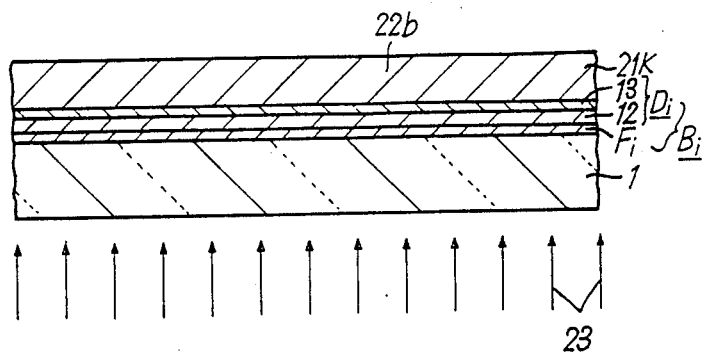
Figure 20C:
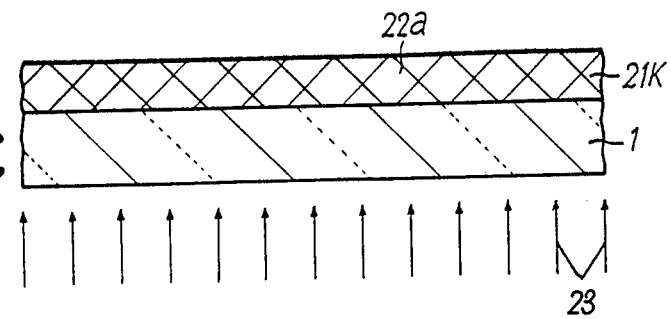
Figure 20D:
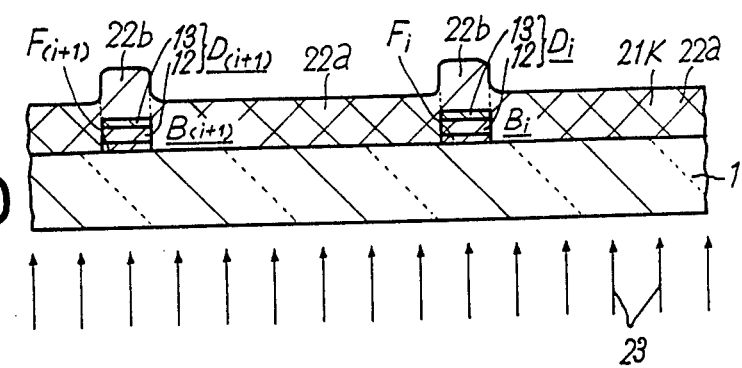
Figure 20E:
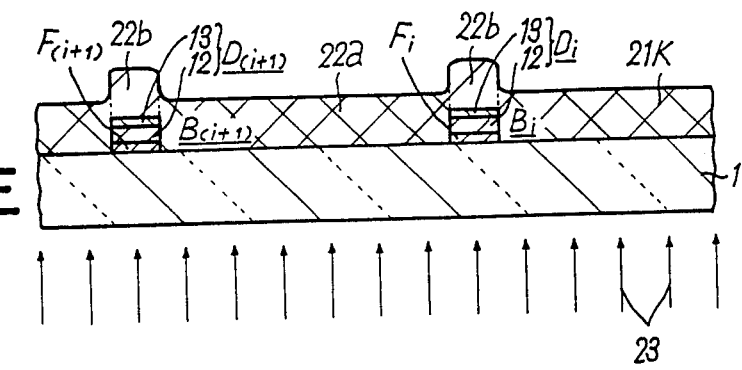
Figure 21A:
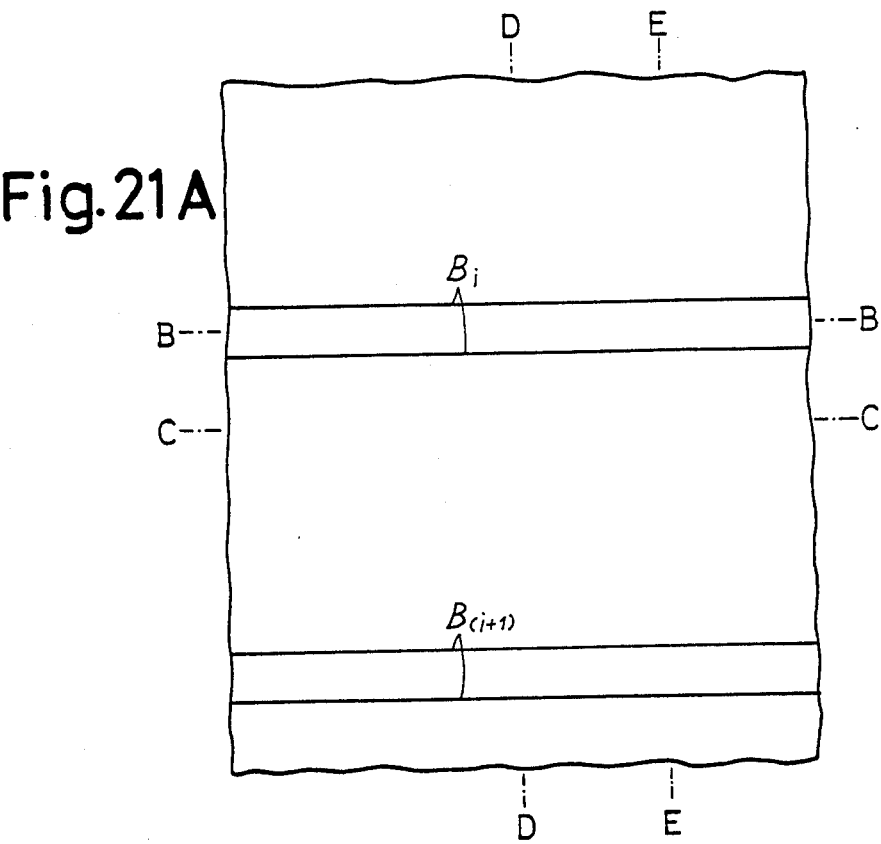
Figure 21B:
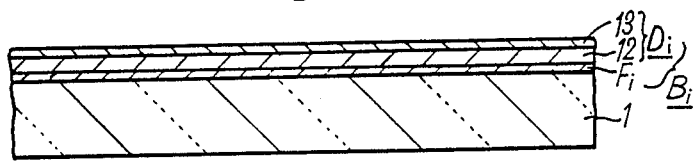
Figure 21C:
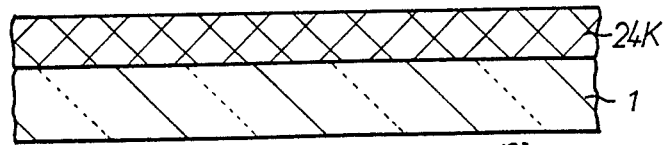
Figure 21D:
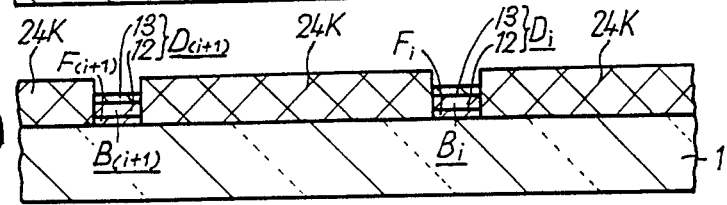
Figure 21E:
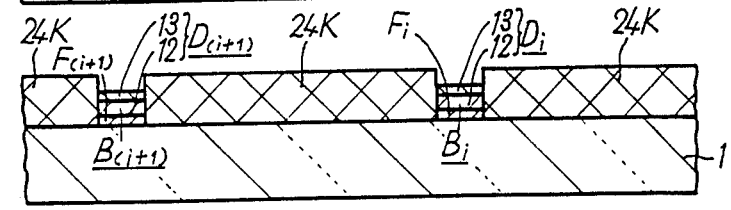
Figure 22A:
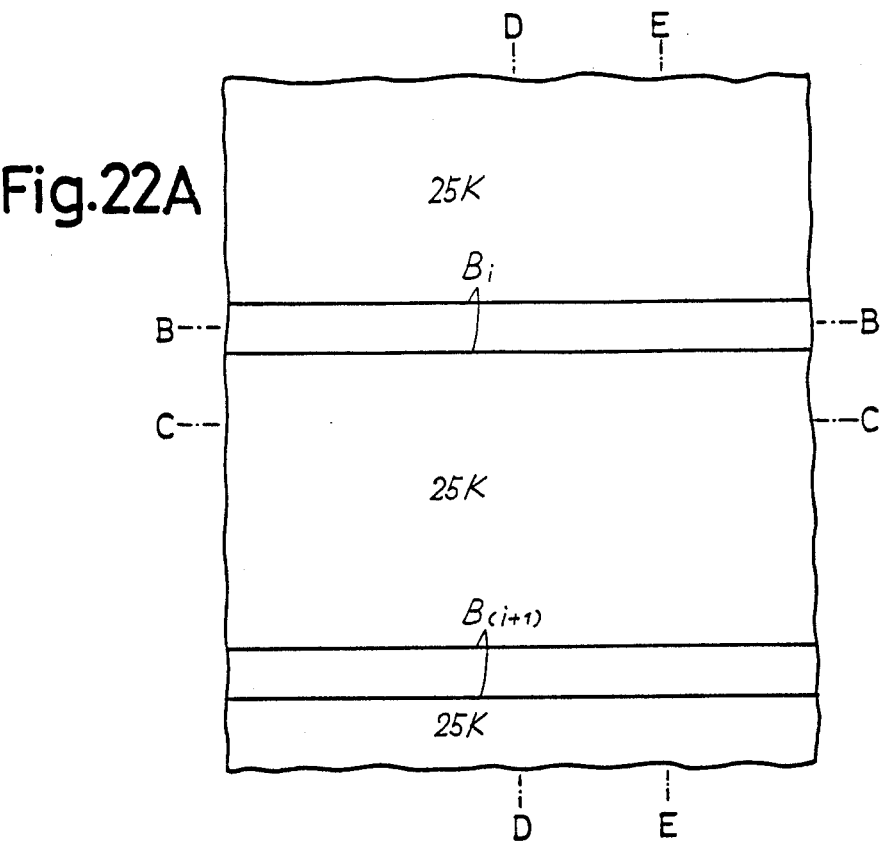
Figure 22B:
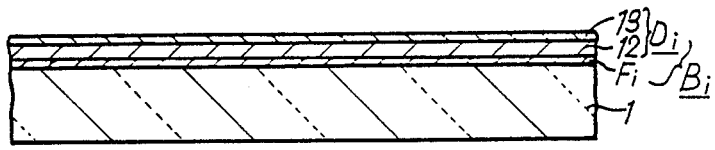
Figure 22C:
Figure 22D:
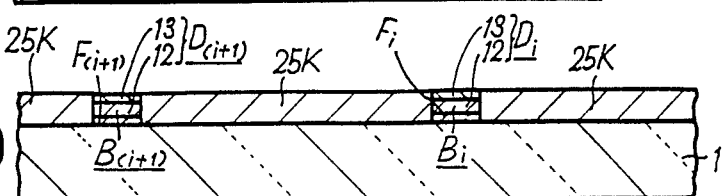
Figure 22E:
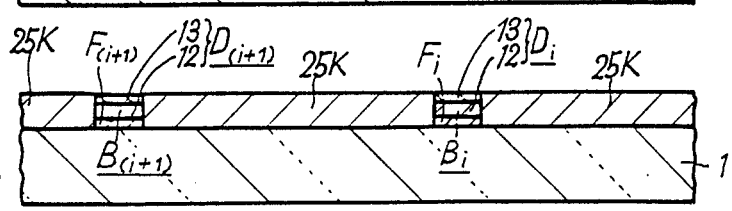
Figure 23A:
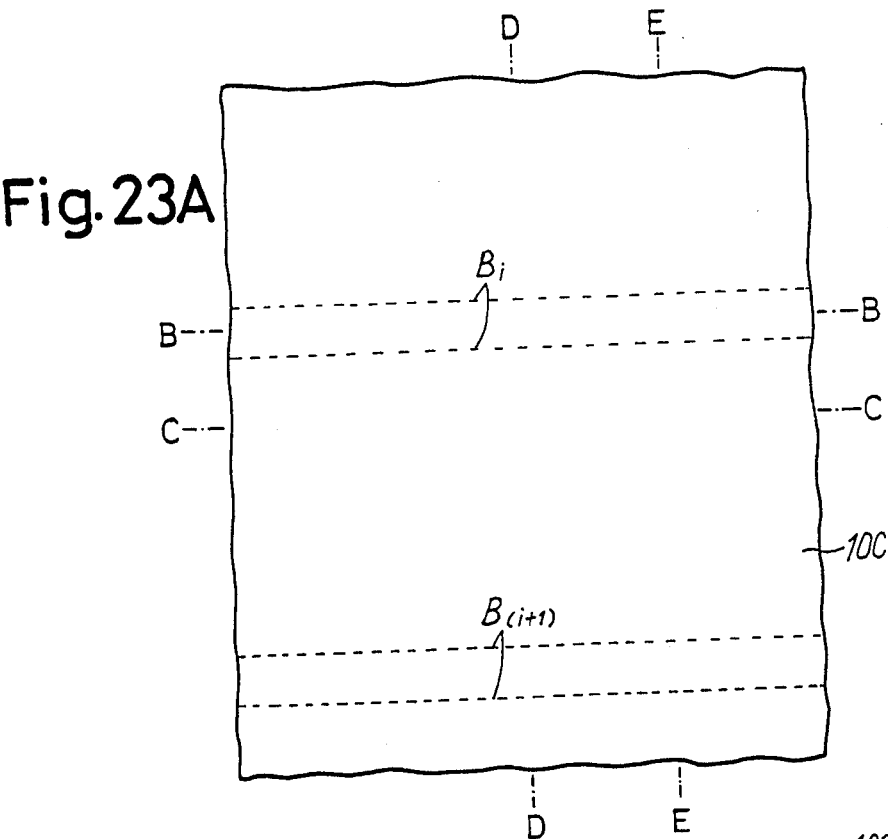
Figure 23B:
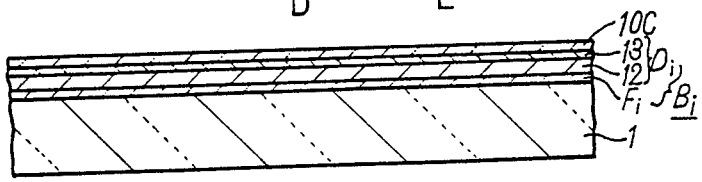
Figure 23C:
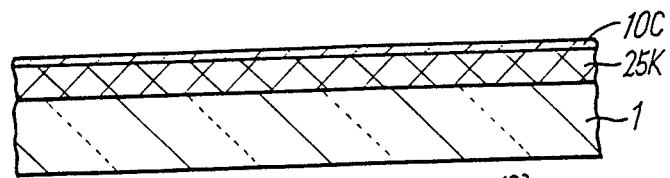
Figure 23D:
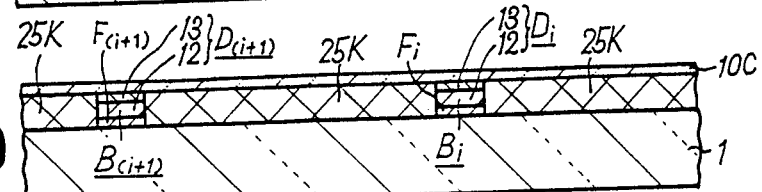
Figure 23E:
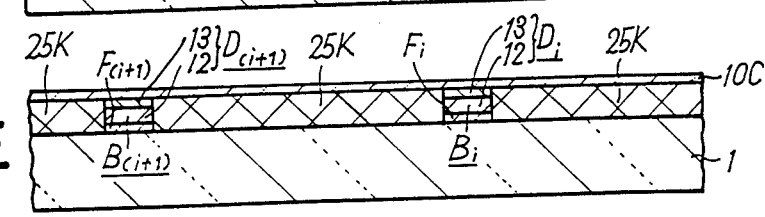
Figure 24A:
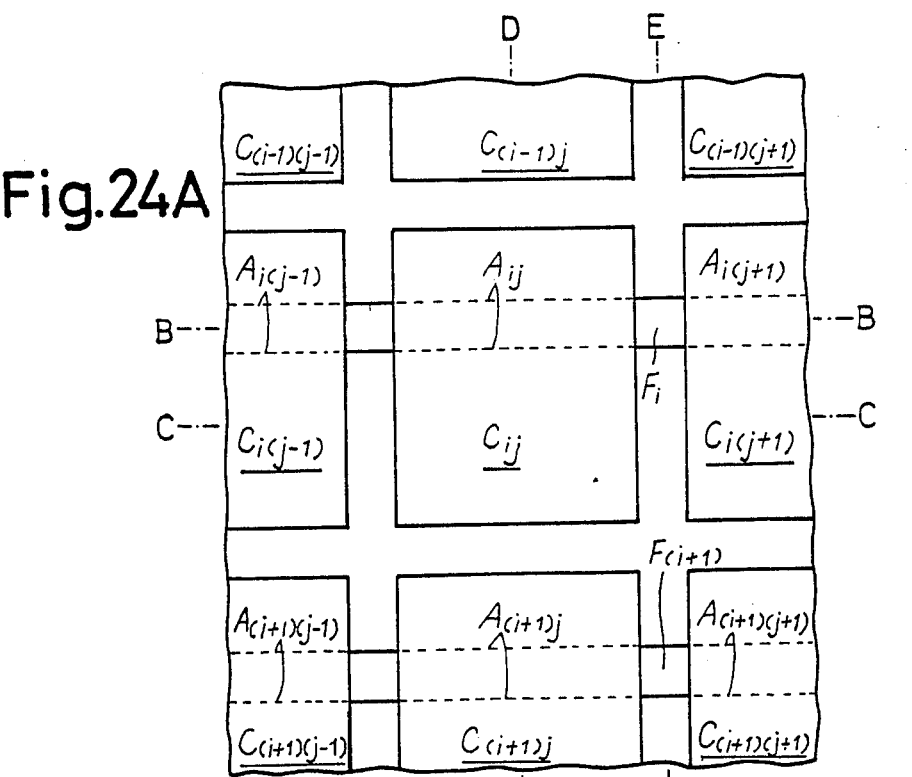
Figure 24B:
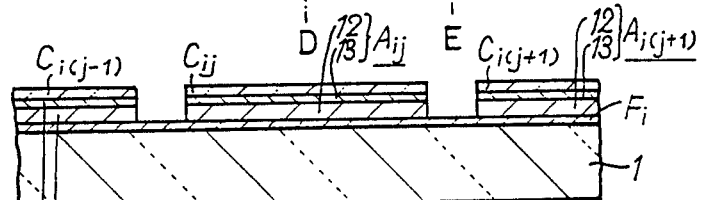
Figure 24C:
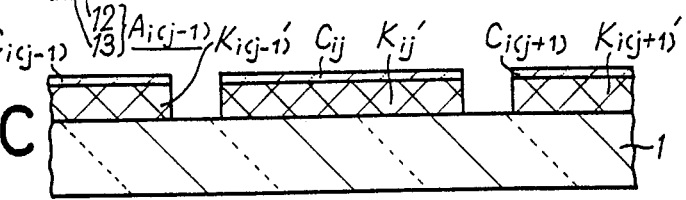
Figure 24D:
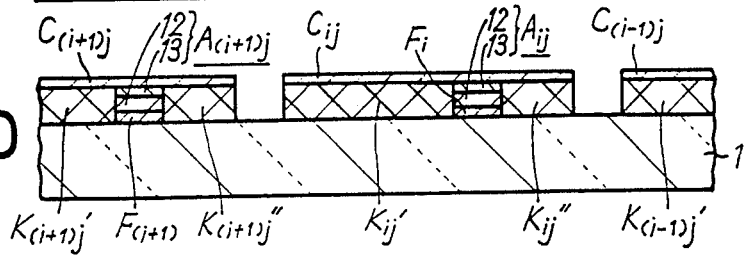
Figure 24E:
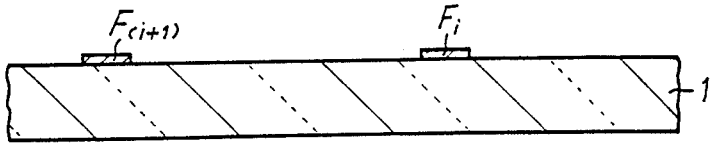
Figure 25A:
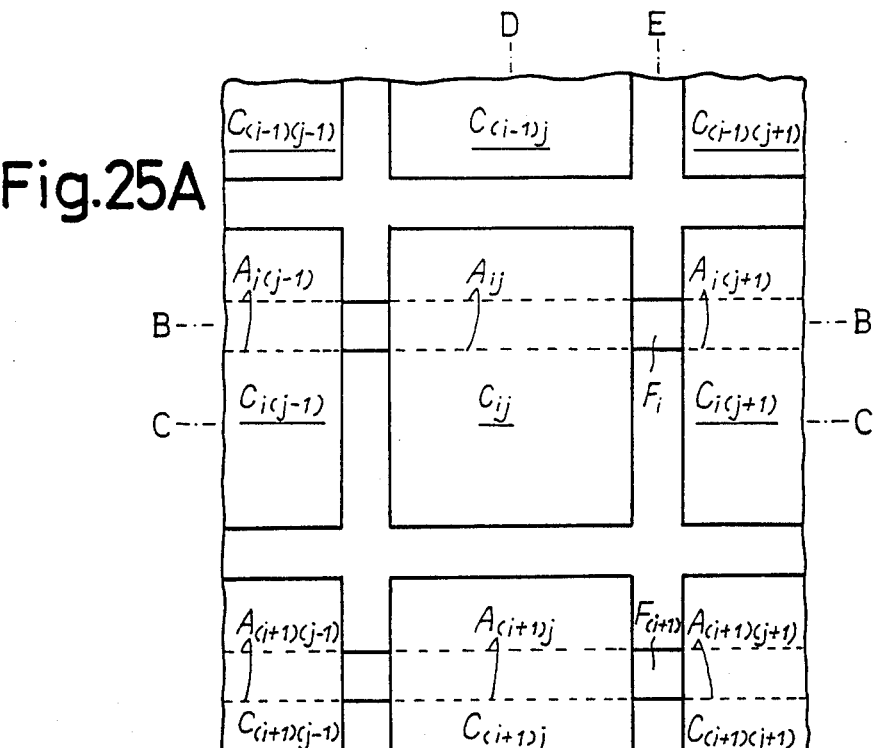
Figure 25B:
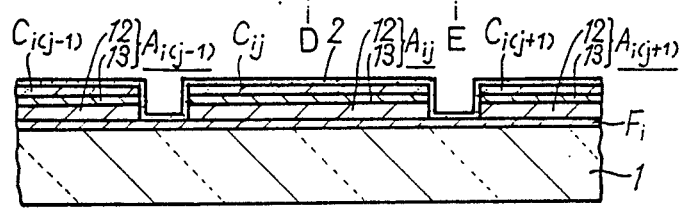
Figure 25C:
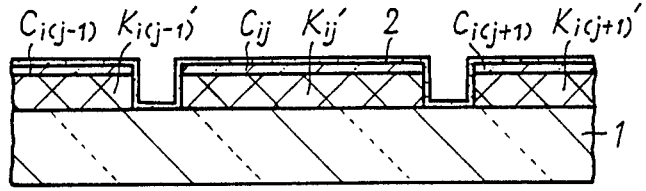
Figure 25D:
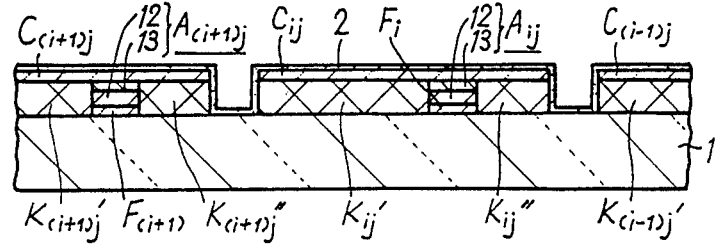
Figure 25E:
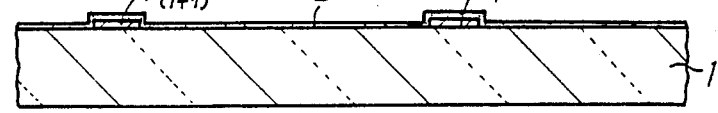

Therefore, according to the arrangement described above in connection with FIGS. 1A to 1E, since the liquid crystal element $L_{ij}$ can be controlled to be transparent or nontransparent through the nonlinear element $U_{ij}$ by applying, through use of row and column decoders 51X and 51Y, red and blue drive signals across the liquid crystal display cells $M_{i1}$, $M_{i4}$, $M_{i7}$..., $M_{i2}$, $M_{i5}$; , $M_{i8}$... and $M_{i3}$, $M_{i6}$, $M_{i9}$... via the conductive layers $F_i$ and $H_1$, $H_4$, $H_7$ $H_{10}$..., $F_i$ and $H_2$, $H_5$, $H_8$... and $F_i$ and $H_3$, $H_6$, $H_9$..., as shown in FIG. 4, a color display can be provided. Accordingly, the liquid crystal display panel shown in FIGS. 1A to 1E is able to provide a color image display. The liquid crystal display panel shown in FIGS. 1A to 1E can be obtained a monocolor image display by omitting the color filters $S_1$ to $S_n$.

FIGS. 15A to 15E illustrate another embodiment of the liquid crystal display panel of the present invention.

In FIGS. 15A to 15E like parts corresponding to those in FIGS. 1A to 1E are identified by the same reference numerals.

The same substrate 1, which is identical in structure with the substrate 1 depicted in FIGS. 1A to 1E, has sequentially arranged thereon a plurality m of stripelike conductive layers $F_1$, $F_2$... $F_m$. The conductive layer $F_j$ is the same as the conductive layer $F_j$ depicted in FIGS. 1A to 1E except that it is nontransparent and is formed of, for instance, chromium.

The conductive layer $F_j$ has sequentially formed thereon stripe-like layers $A_{i1}$, $A_{i2}$... $A_{in}$. The layer member $A_{ij}$ extends in the row direction and has the same width as that of the conductive layer $F_j$. The opposing side surfaces b and b' of the layer member $A_{ij}$ which determine the width of the layer member $A_{ij}$ are substantially aligned with the opposing side surfaces b and b' of the conductive layer, which, in turn, determine the width of the conductive layer $F_j$. The layer member $A_{ij}$ is the same as the laminate member $A_{ij}$ depicted in FIGS. 1A to 1E except that it has the layer member 12 and the conductive layer 13 but does not have the conductive layer 11. The layer member $A_{ij}$, however, may has the conductive layer 11.

The substrate 1 has formed thereon rectangular insulating layers $K_{11}'$ to $K_{1n}'$, $K_{21}'$ to $K_{2n}'$,... $K_{m1}'$ to $K_{mn}'$ and $K_{11}''$ to $K_{1n}''$, $K_{21}'$ to $K_{2n}'''$,... $K_{m1}''$ to $K_{mn}''$. The insulating layers $K_{11}'$ to $K_{mn}'$ and $K_{11}''$ to $K_{mn}''$ are formed of the same material as that for the insulating layers $K_{11}$ to $K_{m(n-1)}$ depicted in FIGS. 1A to 1E. The insulating layer $K_{ij}'$ and $K_{ij}''$ are in contact with the side surfaces b and b' of the layer member $A_{ij}$, respectively. The insulating layer $K_{ij}'$ and $K_{ij}''$ have the same width and thickness as those of the laminate member $A_{ij}$. The opposing side surfaces b and b' of the insulating layer $K_{ij}'$ and $K_{ij}''$, which determine the width of the insulating layer $K_{ij}'$ and $K_{ij}''$ are substantially aligned with the opposing side surfaces a and a' of the layer member $A_{ij}$, which determine the length of the layer member $A_{ij}'$.

A conductive layer $C_{ij}$ which is the same as the conductive layer $C_{ij}$ depicted in FIGS. 1A to 1E is formed on the layer member $A_{ij}$ and the insulating layer $K_{ij}'$ and $K_{ij}''$. The conductive layer $C_{ij}$ has the same width and length as those of the layer member $A_{ij}$ and the insulating layer $K_{ij}'$ and $K_{ij}''$. The one side surface b of the opposing side surfaces b and b' defining the width of the conductive layer $C_{ij}$ is substantially aligned with the side surface a of the laminate member $A_{ij}$ and the side surfaces b of the insulating layers $K_{ij}'$ and $K_{ij}''$. The other side surface b' of the conductive layer $C_{ij}$ is substantially aligned with the side surface a' of the laminate member $A_{ij}$ and the side surfaces b' of the insulating layers $K_{ij}'$ and $K_{ij}''$.

Furthermore, an orienting and insulation layer 2 which is the same as the orienting and insulating layer 2 depicted in FIGS. 1A to 1E is deposited on the substrate 1 to cover the conductive layers $C_{11}$ to $C_{mn}$, the layer members $A_{11}$ to $A_{mn}$, the insulating layers $K_{11}'$ to $K_{mn}'$ and $K_{11}''$ to $K_{mn}''$ and the conductive layers $F_1$ to $F_m$.

The substrate 1, the conductive layers $C_{11}$ to $C_{mn}$, the layer members $A_{11}$ to $A_{mn}$, the insulating layers $K_{11}'$ to $K_{mn}'$ and $K_{11}''$ to $K_{mn}''$, the conductive layers $F_1$ to $F_m$ and the insulating layer 2 make up a substrate member 3 corresponding to the substrate member 3 depicted in FIGS. 1A to 1E.

The substrate member 3 is formed, for example, as follows:

A conductive layer 30F which will ultimately form the conductive layers $F_1$ to $F_m$, a layer member 112 which will ultimately form the layer members 12 of the layer member $A_{11}$ to $A_{mn}$ and a conductive layer 113 which will ultimately form the conductive layers 13 of the layer member $A_{11}$ to Amn are deposited in that order on the substrate 1, as shown in FIGS. 16A to 16E. The conductive layer 30F, the layer member 112 and the conductive layer 113 are formed by the same method as that for the conductive layer 30F, the layer member 112 and the conductive layer 113 depicted in FIGS. 12A to 12E and in FIGS. 5A to 5E, respectively.

The layer member 112 and the conductive layer 113 make up a layer member 10A. The conductive layer 30F and the layer member 10A make up a layer member 100.

Next, the layer member 100 is subjected to a known patterning process using a first mask, providing m layer members $B_1$ to $B_m$ of the same pattern as the conductive layers $F_1$ to $F_m$, as shown in FIGS. 17A to 17E. As the result of this, the conductive layers $F_1$ to $F_m$ are obtained. The layer member $B_i$ is a laminate member composed of the conductive layer $F_i$ and a layer member $D_i$ which will ultimately form the layer member $A_{i1}$ to $A_{in}$.

Next, a photosensitive organic resin layer 20K of same material as the resin layer 20K depicted in FIGS. 7A to 7E, which will ultimately form the insulating layers $K_{11}'$ to $K_{mn}'$ and $K_{11}''$ to $K_{mn}''$, is formed on the substrate 1, covering the layer members $B_1$ to $B_m$, by the same coating method as mentioned previously with respect to the resin layer 20K depicted in FIGS. 7A to 7E.

Next, the photosensitive organic resin layer 20K is heat-hardened, as required, providing a heat-hardened photosensitive organic resin layer 21K which is the same as the resin layer 21K depicted in FIGS. 8A to 8E, as shown in FIGS. 19A to 19E.

Next, the heat-hardened photosensitive resin layer 21K is exposed to light as indicated by 23 in FIGS. 20A to 20E. In this case, portions 22a of the photosensitive resin layer 21K which does not lie on the layer members $B_{11}$ are exposed to $B_{mn}$ to a larger amount of light than portion 22b of the resin layers 21K which lie on the layer members $B_1$ to $B_m$, in the example shown in FIGS. 9A to 9E.

Next, the photosensitive resin layer 21K thus exposed to light 23 is developed to provide an organic resin layer 24K which has substantially no photosensitivity, as depicted in FIGS. 21A to 21E.

Next, the organic resin layer 24K is hardened by heating, to obtain heat-hardened organic resin layers 25K as the insulating layers, as depicted in FIGS. 22A to 22E.

Next, a transparent conductive layer 10C of the same material as that of the conductive layer 10C depicted in FIGS. 5A to 5E, will ultimately form the conductive layers $C_{11}$ to $C_{mn}$, is deposited over the substrate 1 to cover the laminate member $B_1$ to $B_m$ and the insulating layers 25K, as shown in FIGS. 23A to 23E.

Next, the conductive layer 10C, the layer members $D_1$ to $D_m$ of the layer members $B_1$ to $B_m$ and the insulating layers 25K are patterened by a known method using a second mask into the conductive layers $C_{11}$ to $C_{mn}$, the layer members $A_{11}$ to $A_{mn}$ and the insulating layers $K_{11}'$ to $K_{mn}'$ and $K_{11}''$ to $K_{mn}''$, as shown in FIGS. 24A to 24E. In this case, the conductive layers $F_1$ to $F_m$ are not patterned.

Next, the thin orienting and insulating layer 2 formed of the same material as the orienting and insulating layer 2 depicted in FIGS. 14A to 14E is deposited on the substrate 1 to cover the the conductive layers $C_{11}$ to $C_{mn}$, the layer members $A_{11}'$ to $A_{mn}'$, the conductive layers $F_1$ to $F_m$ and the insulating layers $K_{11}'$ to $K_{mn}'$ and $K_{11}''$ to $K_{mn}''$.

Referring now back to FIGS. 15A to 15E, another substrate member 8 corresponding to that shown in FIGS. 1A to 1E is provided.

Since the substrate member 8 is identical in construction with the substrate member 8 described previously with respect to FIGS. 1A and 1E and fabricated by the same method as that for the latter, the parts corresponding to those in FIGS. 1A and 1E are identified by the same reference numerals and no detailed description will be given thereof.

The substrate member 8 is disposed upside down by a suitable support means (not shown) in opposing relation to the top of the substrate member 3 in parallel thereto, as is the case with the example depicted in FIGS. 1A to 1E. The substrate member 3 and 8 define a space 3 μm or less, for example 1.0 μm±0.5 μm in height between that part of the surface of the substrate member 3 under which the conductive layer $C_{ij}$ lies and that part of the surface of the substrate member 8 the part 15 of the conductive layer $H_j$ lies. The part of the conductive layer $H_j$ is a portion confronting the conductive layer $C_{ij}$, as the case with the example set fourth previously in respect of FIGS. 1A to 1E. A space defined by the substrate members 3 and 8 is filled with ferroelectric liquid crystal 9, as in the case of the example shown in FIGS. 1A to 1E. The ferroelectric liquid crystal 9 is also oriented in the same manner as in the example depicted in FIGS. 1A to 1E.

In the structure described above in conjunction with FIGS. 15A to 15E, the conductive layer $C_{ij}$ deposited over the substrate 1 and the part 15 of the conductive layer $H_{j}$, deposited over the substrate 5, which face the conductive layer $C_{ij}$ and the part 16 of the ferroelectric liquid crystal 9 between the conductive layer $C_{ij}$ and the part 14 of the conductive layer $H_j$, constitute a ferroelectic liquid crystal element $L_{ij}$ which employs the conductive layer $C_{ij}$ and the part 14 of the conductive layer $H_j$ as its electrodes and corresponds to the liquid crystal element $L_{ij}$ mentioned in connection with FIGS. 1A to 1E. When low voltage is applied across the conductive layers $C_{ij}$ and $H_j$, the ferroelectric liquid crystal element $L_{ij}$ remain opaque, but when high voltage is applied, it becomes transparent as in the example depicted in FIGS. 1A to 1E.

The layer member $A_{ij}$ and a part 17 of the conductive layer $F_i$, which underlie the layer member $A_{ij}$, constitute a nonlinear element $U_{ij}$ which employs the part 17 of the conductive layers $F_i$ and the conductive layer 13 as its electrodes and corresponds to the nonlinear element $U_{ij}$ mentioned previously in connection with FIGS. 1A to 1E. The nonlinear element $U_{ij}$ presents nonlinear voltage(V)-current(A) characteristics similar to those obtainable in the example shown in FIGS. 1A to 1E and has an offset voltage similar to that in the example mentioned previously in connection with FIGS. 1A to 1E.

The liquid crystal element $L_{ij}$ and the nonlinear element $U_{ij}$ are connected in series with each other, and hence make up a liquid crystal display cell $M_{ij}$.

According to the arrangement described above with respect to FIGS. 15A to 15E, the substrates 1 and 5 and the conductive layers $H_j$ and $C_{ij}$ are transparent. Furthermore, the red filters $S_1$, $S_4$, $S_7$, $S_n$..., the green filters $S_2$, $S_5$, $S_8$ $S_{11}$... and the blue filters $S_3$, $S_6$, $S_9$... are disposed under the column conductive layer $H_1$, $H_4$, $H_7$ $H_{10}$..., $H_2$, $H_5$, $H_8$... $H_3$, $H_6$, $H_9$..., respectively.

Therefore, according to the arrangement described above in connection with FIGS. 15A to 15E, since the liquid crystal element $L_{ij}$ can be controlled to be transparent or nontransparent through the nonlinear element $U_{ij}$ by applying, red, green and blue drive signals, through use of row and column decoders 51X and 51Y, across the liquid crystal display device $M_{i1}$, $M_{i4}$ and $M_{i7}$..., $M_{i2}$, $M_{i5}$, $M_{i8}$... and $M_{i3}$, $M_{i6}$, $M_{i9}$... via the conductive layers $F_i$ and $H_1$, $H_4$, $H_7$ $H_{10}$..., $F_i$ and $H_2$, $H_5$, $H_8$..., and $F_i$ and $H_3$, $H_6$, $H_9$..., as shown in FIG. 4, a color display can also be provided. Accordingly, the liquid crystal display panel shown in FIGS. 15A to 15E provide a color image display. Also, the liquid crystal display panel can be provides a monocolor by eliminating the filter $S_1$ to $S_n$.

It will be apparent that the above embodiment should be construed as merely illustrative of the present invention and should not be construed as limiting the invention specifically thereto and that various modifications and variations may be effected without departing from the scope of the novel concepts of the invention.

What is claimed is:

1. A liquid crystal display panel comprising:
   (A) first and second substrate members disposed opposite at a predetermined distance in substantially parallel relation to each other; and ferroelectric liquid crystal filled between the first and second substrate members;
   (B) wherein the first substrate member comprises (a) a first substrate having an insulating surface, (b) a plurality $m \times n$ ($m>1$, $n>1$) of first conductive layers $C_{11}$ to $C_{1n}$, $C_{21}$ to $C_{2n}$, ... $C_{m1}$ to $C_{mn}$ arranged in a matrix form on the first substrate, (c) a layer member $A_{ij}$ formed on the first conductive layer $C_{ij}$ (where $i=1, 2 \ldots m$ and $j=1, 2 \ldots n$) and (d) a stripe-like second conductive layer $F_i$ extending in the row direction and making contact with the layer members $A_{i1}, A_{i2}, \ldots A_{in}$ on the side opposite from the first conductive layers $C_{i1}, C_{i2} C_{i3}, \ldots C_{in}$, wherein the opposing side surfaces of the layer member $A_{ij}$ defining its length are substantially aligned with the opposing side surfaces of the first conductive layer $C_{ij}$ defining its width, respectively, and wherein the opposing side surfaces of the layer member $A_{ij}$ defining its width are substantially aligned with the opposing side surfaces of the second conductive layer $F_i$ defining its wdith, respectively;
   (C) wherein the second substrate member comprises (a) a second substrate having an insulating surface and (b) a plurality n of stripe-like third conductive layers $H_1, H_2, \ldots H_n$ sequentially arranged in the row direction on the second substrate and extending in the column direction, the third conductive layer $H_j$ being opposite to the first conductive layers $C_{ij}$ to $C_{mj}$; and
   (D) wherein the laminate member $A_{ij}$ constitutes a non linear element $U_{ij}$, and a first part of the first conductive layer $C_{ij}$ on which the layer member $A_{ij}$ does not extend, a second part of the conductive layer $H_j$ confronting the first part of the first conductive layer $C_{ij}$, and a third part of the ferroelectric liquid crystal between the first part of the first conductive layer $C_{ij}$ and the second part of the second conductive layer $H_j$ constitute a ferroelectric liquid crystal element $L_{ij}$.

2. A liquid crystal display panel according to claim 1 wherein the first and second substrate members define a space 3 μm or less in height between that part of the surface of the first substrate member under which the first part of the conductive layer $C_{ij}$ lies and that part of the surface of the second substrate member under which the second part of the conductive layer $H_j$ lies, the space being filed with the ferroelectric liquid crystal.

3. A liquid crystal display panel according to claim 1 wherein the first and second substrates and the first and third conductive layers are transparent.

4. A liquid crystal display panel according to claim 1 wherein the layer member $A_{ij}$ has a nontransparent fourth conductive layer formed on the first conductive layer $C_{ij}$, a layer member formed on the fourth conductive layer and a nontransparent fifth conductive layer formed on the layer member, and wherein the layer member formed on the fourth conductive layer is a non-single-crystal semiconductor layer member having an n-i-n type, n-i-p(or p⁻)-i-n type, p-i-p type, or p-i-n(or n⁻)-i-p type structure or is an insulating layer which permits the passage therethrough of tunnel current.

5. A liquid crystal display panel according to claim 4 wherein the layer member $A_{ij}$ further has an insulating layer formed on the fifth conductive layer.

6. A liquid crystal display panel according to claim 1 wherein the first and second substrate members are covered with first and second orienting and insulating layers, respectively.

7. A liquid crystal display panel according to claim 1 wherein the first substrate has an insulating layer $K_{ij}$ (where j does not take n with respect to the insulating layer $K_{ij}$) formed thereon at a portion between the layer members $A_{ij}$ and $A_{i(j+1)}$, and wherein the second conductive layer $F_i$ extends on the insulating layers $K_{i1}$ to $K_{i(n-1)}$.

8. A liquid crystal display panel according to claim 7 wherein the opposing side surfaces of the insulating layer $K_{ij}$ defining its width are substantially aligned with the opposing side surfaces of the second conductive layer $F_i$ defining its width.

9. A liquid crystal display panel comprising:
   (A) first and second substrate members disposed oppositely at a predetermined distance in substantially parallel relation to each other; and
   ferroelectric liquid crystal filled between the first and second substrate members;
   (B) wherein the first substrate member comprises (a) a first substrate having an insulating surface, (b) a plurality m of stripe-like first conductive layers $F_1, F_2, \ldots F_m$ arranged in the column direction of the first substrate and extending in the row direction, (c) a plurality n of layer members $A_{i1}, A_{i2}, \ldots A_{in}$ (where $i=1, 2, \ldots m$) formed on the first conductive layer $F_1$ and (d) a second conductive layer $C_{ij}$ making contact with the layer members $A_{ij}$ (where $j=1, 2, \ldots n$) on the side opposite from the first conductive layers $F_i$, wherein the opposing side surfaces of the second conductive layer $C_{ij}$ defining its width are substantially aligned with the opposing side surfaces of the layer member $A_{ij}$ defining its length, respectively;
   (C) wherein the second substrate member comprises (a) a second substrate having an insulating surface and (b) a plurality n of stripe-like third conductive layers $H_1, H_2, \ldots H_n$ sequentially arranged in the row direction on the second substrate and extending in the column direction, the third conductive layer $H_j$ being opposite to the second conductive layers $C_{1j}$ to $C_{mj}$; and
   (D) wherein the laminate member $A_{ij}$ constitutes a non-linear element $U_{ij}$, and the first conductive layer $C_{ij}$, a part of the conductive layer $H_j$ confronting the first conductive layer $C_{ij}$, and a part of the ferroelectric liquid crystal between the first conductive layer $C_{ij}$ and the part of the second conductive layer $H_j$ constitute a ferroelectric liquid crystal element $L_{ij}$.

10. A liquid crystal display panel according to claim 9 wherein the first and second substrate members define a space 3 μm or less in height between that part of the surface of the first substrate member under which the conductive layer $C_{ij}$ lies and that part of the surface of the second substrate member under which the conductive layer $H_j$ confronting the conductive layer $C_{ij}$ lies, the space being filled with the ferroelectrric liquid crystal.

11. A liquid crystal display panel according to claim 9 wherein the first and second substrates and the first and third conductive layers are transparent.

12. A liquid crystal display panel according to claim 9 wherein the layer member $A_{ij}$ has a layer member formed on the first conductive layer $F_i$ and a nontransparent fourth conductive layer formed on the layer member, and wherein the layer member formed on the first conductive layer $F_i$ is a non-single-crystal semiconductor layer member having an n-i-n type, n-i-p(or p$^-$)-i-n type, p-i-p type, or p-i-n(or n$^-$)-i-p type structure or is an insulating layer which permits the passage therethrough of tunnel current.

13. A liquid crystal display panel according to claim 9 wherein the layer member $A_{ij}$ has a nontransparent fourth conductive layer formed on the first conductive layer $F_i$, a layer member formed on the fourth conductive layer $F_i$ and a nontransparent fifth conductive layer formed on the layer member, and wherein the layer member formed on the fourth conductive layer $F_i$ is a non-single-crystal semiconductor layer member having an n-i-n type, n-i-p(or p$^-$)-i-n type, p-i-p type, or p-i-n(or n$^-$)-i-p type structure or is an insulating layer which permits the passage therethrough of tunnel current.

14. A liquid crystal display panel according to claim 9 wherein the first and second substrate members are covered with first and second orienting and insulating layers, respectively.

15. A liquid display panel according to claim 9 wherein the first substrate has insulating layers $K_{ij}'$ and $K_{ij}''$ formed thereon under the second conductive layer $C_{ij}$, the insulating layer $K_{ij}'$ making contact with the first surface of the first conductive layer $F_i$ and the first surface of the layer member $A_{ij}$, the insulating layer $K_{ij}''$ making contact with the second surface of the first conductive layer $F_i$ and the second surface of the layer member $A_{ij}$, the first and second surfaces of the first conductive layer $F_i$ defining its width, and the first and second surfaces of the layer member $A_{ij}$ defining its width.

16. A liquid crystal display panel according to claim 15 wherein the side surface opposite from the layer member $A_{ij}$ of the insulating layer $K_{ij}'$ and the side surface opposite from the layer member $A_{ij}$ of the layer member $A_{ij}$ are substantially aligned with the opposite side surfaces of the second conductive layer $C_{ij}$ defining its length.

17. A method for the manufacture of a liquid crystal display panel, comprising the steps of:
(A) preparing a first substrate member by the steps of:
  (a) forming, on a transparent first substrate, a first layer member which has a first conductive layer formed on the first substrate and a second layer member formed on the first conductive layer, the second layer member having a second conductive layer formed on the first conductive layer, a third layer member formed on the second conductive layer and a third conductive layer formed on the third layer member, the third layer member having a non-single-crystal layer member or a first insulating layer which permits the passage therethrough of tunnel current;
  (b) patterning the first layer member into a plurality m×n (m>1, n>1) of fourth layer members $B_{11}$ to $B_{1n}$, $B_{21}$ to $B_{2n}$, . . . $B_{m1}$ to $B_{mn}$ sequentially arranged in a matrix form, the fourth layer member $B_{ij}$ (where i=1, 2 . . . m and j=1, 2, 3, . . . n) having a fourth conductive layer $C_{ij}$ formed by the first conductive layer on the first substrate and a fifth layer member $D_{ij}$ formed by the second layer member on the fourth conductive layer $C_{ij}$;
  (c) depositing, on the first substrate, a photosensitive organic resin layer to cover the fourth laminate members $B_{11}$ to $B_{mn}$;
  (d) forming, by the photosensitive resin layer, a second insulating layer surrounding each of the fourth layer members $B_{11}$ to $B_{mn}$ on the first substrate, the second insulating layer forming step including exposure of the photosensitive organic resin layer to light applied from the side of the first substrate and development of the exposed photosensitive organic resin layer;
  (e) depositing, over the first substrate, a fifth conductive layer extending on the fourth layer members $B_{11}$ to $B_{mn}$ and the first insulating layer;
  (f) patterning the fifth conductive layer, the fourth layer members $B_{11}$ to $B_{1n}$, $B_{21}$ to $B_{2n}$, . . . $B_{m1}$ to $B_{mn}$ and the second insulating layer into sixth layer members $A_{11}$ to $A_{1n}$, $A_{21}$ to $A_{2n}$, . . . . $A_{m1}$ to $A_{mn}$ formed by the fourth layer member $B_{11}$ to $B_{1n}$, $B_{21}$ to $B_{2n}$, $B_{31}$ to $B_{3n}$, . . . $B_{m1}$ to $B_{mn}$ on the fourth conductive layers $C_{11}$ to $C_{1n}$, $C_{21}$ to $C_{2n}$, . . . $C_{m1}$ to $C_{mn}$, respectively, third insulating layers $K_{11}$ to $K_{1(n-1)}$, $K_{21}$ to $K_{2(n-1)}$, . . . $K_{m1}$ to $K_{m(n-1)}$ formed by the first insulating layer on the first substrate between the sixth layer members $A_{11}$ and $A_{12}$ to $A_{1(n-1)}$ and $A_{1n}$, $A_{21}$ and $A_{22}$ to $A_{2(n-1)}$ and $A_{2n}$, . . . $A_{m1}$ and $A_{m2}$ to $A_{m(n-1)}$ and $A_{mn}$ and sixth conductive layers $F_1$, $F_2$, . . . $F_m$ formed by the fifth conductive layer and extending on the sixth layer members $A_{11}$ to $A_{1n}$ and the insulating layers $K_{11}$ to $K_{1(n-1)}$, the sixth layer members $A_{21}$ to $A_{2n}$ and the third insulating layers $K_{21}$ to $K_{2(n-1)}$, . . . the sixth layer members $A_{m1}$ to $A_{m2}$ and the third insulating layers $K_{m1}$ to $K_{m(n-1)}$, respectively;
(B) preparing a second substrate member by the steps of:
  forming, on or over a second substrate having an insulating surface, a plurality n of seventh conductive layers $H_1$, $H_2$, . . . $H_n$ sequentially arranged in the row direction and extending in the column direction;
(C) turning the second substrate member upside down and deposing the first and second substrate members in opposing and substantially parallel relation to each other; and
(D) filling ferroelectric liquid crystal in a space between the first and second substrate members.

18. The manufacturing method according to claim 17 wherein the second insulating layer forming step further includes heat-hardening of the photosensitive organic resin layer prior to the exposure of the photosensitive organic resin layer and heat-hardening of an organic resin layer resulting from the development of the exposed photosensitive organic resin layer.

19. The manufacturing method according to claim 18 wherein the photosensitive organic resin layer is formed thicker than the fourth layer members $B_{11}$ to $B_{mn}$ on the substrate.

20. The manufacturing method according to claim 19 wherein the photosensitive organic resin layer is formed to such thickness on the substrate that the insulating layer may be formed to substantially the same thickness as the fourth layer member $B_{11}$ to $B_{mn}$.

21. The manufacturing method according to claim 17 wherein the first substrate member preparing step further includes forming a first orienting and insulating layer to cover the sixth conductive layers $F_1$ to $F_m$, the sixth layer member $A_{11}$ to $A_{mn}$, the third insulating layers $K_{11}$ to $K_{m(n-1)}$ and the fourth conductive layers $C_{11}$ to $C_{mn}$, and the second substrate member preparing step further includes forming a second orienting and insulating layer to cover the seventh conductive layer $H_1$ to $H_n$.

22. A method for the manufacture of a liquid crystal display panel, comprising the steps of:
(A) preparing a first substrate member by the steps of:
  (a) forming, on a first substrate, a first layer member which has a first conductive layer formed on the first substrate and a second layer member formed on the first conductive layer, the second layer member having a third layer member formed on the first conductive layer and a second conductive layer formed on the third layer member, the third layer member have a non-single-crystal layer member or a first insulating layer which permits the passage therethrough of tunnel current;
  (b) patterning the first layer member into a plurality m of fourth laminate members $B_1, B_2, \ldots B_m$ sequentially arranged in the column direction and extending in the row direction, the fourth layer member $B_i$ (where $i = 1, 2 \ldots m$) having a third conductive layer $F_i$ formed by the first conductive layer on the first substrate and a fifth layer member $D_i$ formed by the second layer member on the third conductive layer $F_i$;
  (c) depositing, on the first substrate, a photosensitive organic resin layer to cover the fourth laminate members $B_1$ to $B_m$;
  (d) forming, by the photosensitive resin layer, a second insulating layer surrounding each of the layer members $B_1$ to $B_m$ on the first substrate, the second insulating layer forming step including exposure of the photosensitive organic resin layer to light applied from the side of the first substrate and development of the exposed photosensitive organic resin layer;
  (e) depositing, over the first substrate, a fourth conductive layer extending on the fourth layer members $B_1$ to $B_m$ and the second insulating layer;
  (f) patterning the fourth conductive layer, the fifth layer members $D_1$ to $D_m$ and the second insulating layer into fifth conductive layer $C_{11}$ to $C_{1n}$, $C_{21}$ to $C_{2n}$, ... $C_{m1}$ to $C_{mn}$ formed by the fourth conductive layer, sixth layer members $A_{11}$ to $A_{1n}$, $A_{21}$ to $A_{2n}$, ... $A_{m1}$ to $A_{mn}$ formed by the fifth layer member $D_1$ to $D_2, \ldots D_m$ on the third conductive layers $F_1, F_2, \ldots F_m$, respectively, third insulating layers $K_{11}'$ to $K_{1n}'$, $K_{21}'$ to $K_{2n}'$, ... $K_{m1}'$ to $K_{mn}'$ and fourth insulating layer $K_{11}''$ to $K_{1n}''$, $K_{21}''$ to $K_{2n}'', \ldots K_{m1}''$ to $K_{mn}''$ formed by the second insulating layer on the first substrate the third insulating layer $K_{ij}'$ being formed under the fifth conductive layer $C_{ij}$ and making contact with the first surface of the third conductive layer $F_i$ and the first surface of the sixth layer member $A_{ij}$, the fourth insulating layer $K_{ij}''$ being formed under the fifth conductive layer $C_{ij}$ and making contact with the second surface of the third conductive layer $F_i$ and the second surface of the sixth layer member $A_{ij}$, the first and second surfaces of the third conductive layer $F_i$ defining its width, and the first and second surface of the sixth layer member $A_{ij}$ defining its width.
(B) preparing a second substrate member by the steps of:
  forming, on or over a second substrate having an insulating surface, a plurality n of sixth conductive layers $H_1, H_2, \ldots H_n$ sequentially arranged in the row direction and extending in the column direction;
(C) turning the second substrate member upside down and deposing the first and second substrate members in opposing and substantially parallel relation to each other; and
(D) filling ferroelectric liquid crystal in a space between the first and second substrate members.

23. A method for the manufacture of a liquid crystal display panel, comprising the steps of:
(A) preparing a first substrate member by the steps of:
  (a) forming, on a transparent first substrate, a first layer member which has a first conductive layer formed on the first substrate and a second layer member formed on the first conductive layer, the second layer member having a second conductive layer formed on the first conductive layer, a third layer member formed on the second conductive layer and a third conductive layer formed on the third layer member, the third layer member having a non-single-crystal layer member or a first insulating layer which permits the passage therethrough of tunnel current;
  (b) patterning the first layer member into a plurality n ($n > 1$) of fourth laminate members $B_1, B_2, \ldots B_m$ sequentially arranged in the column direction and extending in the row direction, the fourth layer member $B_1$ (where $i = 1, 2 \ldots m$) having a fourth conductive layer $F_i$ formed by the first conductive layer on the first substrate and a fifth layer member $D_i$ formed by the second layer member on the fourth conductive layer $F_1$;
  (c) depositing, on the first substrate, a photosensitive organic resin layer to cover the fourth laminate members $B_1$ to $B_m$;
  (d) forming, by the photosensitive resin layer, a second insulating layer surrounding each of the fourth layer members $B_1$ to $B_m$ on the first substrate, the second insulating layer forming step including exposure of the photosensitive organic resin layer to light applied from the side of the first substrate and development of the exposed photosensitive organic resin layer;
  (e) depositing, over the first substrate, a fifth conductive layer extending on the fourth layer members $B_1$ to $B_m$ and the second insulating layer;
  (f) patterning the conductive layer, the fifth layer members $D_1, D_2, \ldots D_m$ and the second insulating layer into sixth conductive layer $C_{11}$ to $C_{1n}$, $C_{21}$ to $C_{2n}, \ldots C_{m1}$ to $C_{mn}$ formed by the fifth conductive layer, sixth layer members $A_{11}$ to $A_{1n}$, $A_{21}$ to $A_{2n}$, ... $A_{m1}$ to $A_{mn}$ formed by the fifth layer member $D_1, D_2, \ldots D_m$ on the fourth conductive layers $F_1, F_2, \ldots F_m$, respectively, third insulating layers $K_{11}'$ to $K_{1n}'$, $K_{21}'$ to $K_{2n}', \ldots K_{m1}'$ to $K_{mn}'$ and fourth insulating layer $K_{11}''$ to $K_{1n}''$, $K_{21}''$ to $K_{2n}'', \ldots K_{m1}''$ to $K_{mn}''$ formed by the second insulating layer on the first substrate the third insulating layer $K_{ij}'$ being formed under the sixth conductive layer $C_{ij}$ and making contact with the first surface of the fourth conductive layer $F_i$ and the first surface of the sixth layer member $A_{ij}$, the fourth insulating layer $K_{ij}''$ being formed under the sixth conductive layer $C_{ij}$ and making contact with the second surface of the fourth conductive layer $F_i$ and the second surface of the sixth layer member $A_{ij}$, the first and second surfaces of the fourth conductive layer $F_i$ defining its width, and the first and second surface of the sixth layer member $A_{ij}$ defining its width.

(B) preparing a second substrate member by the steps of:
 forming, on or over a second substrate have an insulating surface, a plurality n of sixth conductive layers $H_1, H_2, \ldots H_n$ sequentially arranged in the row direction and extending in the column direction;

(C) turning the second substrate member upside down and deposing the first and second substrate members in opposing and substantially parallel relation to each other; and (D) filling ferroelectric liquid crystal in a space between the first and second substrate members.

24. The manufacturing method according to claim 22 or 23 wherein the second insulating layer forming step further includes heat-hardening of the photosensitive organic resin layer prior to the exposure of the photosensitive organic resin layer and heat-hardening of an organic resin layer resulting from the development of the exposed photosensitive organic resin layer.

25. The manufacturing method according to claim 22 or 23 wherein the photosensitive organic resin layer is formed thicker than the fourth layer members $B_1$ to $B_m$ on the substrate.

26. The manufacturing method according to claim wherein the photosensitive organic resin layer is formed to such a thickness on the substrate that the insulating layer may be formed to substantially the same thickness as the fourth layer members $B_1$ to $B_m$.

27. The manufacturing method according to claim 22 or 23 wherein the first substrate member preparing step further includes forming a first orienting and insulating layer to cover the fourth conductive layers $F_1$ to $F_m$, the sixth layer member $A_{11}$ to $A_{mn}$, the third insulating layers $K_{11}'$ to $K_{mn}'$ and the fourth insulating $K_{11}''$ to $K_{mn}''$ and the sixth conductive layers $C_{11}$ to $C_{mn}$, and the second substrate member preparing step further includes forming a second orienting and insulating layer to cover the seventh conductive layers $H_1$ to $H_n$.

* * * * *